(12) United States Patent  (10) Patent No.: US 8,285,540 B2
Sato et al.  (45) Date of Patent: Oct. 9, 2012

(54) CHARACTER STRING ANONYMIZING APPARATUS, CHARACTER STRING ANONYMIZING METHOD, AND CHARACTER STRING ANONYMIZING PROGRAM

(75) Inventors: Yoshinori Sato, Sagamihara (JP); Akihiko Kawasaki, Yamato (JP)

(73) Assignee: Hitachi, Ltd., Tokyo (JP)

( * ) Notice: Subject to any disclaimer, the term of this patent is extended or adjusted under 35 U.S.C. 154(b) by 1175 days.

(21) Appl. No.: 12/052,764

(22) Filed: Mar. 21, 2008

(65) Prior Publication Data

US 2009/0018820 A1 Jan. 15, 2009

(30) Foreign Application Priority Data

Jul. 11, 2007 (JP) ................................. 2007-181830

(51) Int. Cl.
*G06F 17/27* (2006.01)
(52) U.S. Cl. .......................................................... 704/9
(58) Field of Classification Search ........................ 704/9
See application file for complete search history.

(56) References Cited

U.S. PATENT DOCUMENTS

| 2003/0005312 | A1 | 1/2003 | Sato |
| 2004/0260459 | A1 | 12/2004 | Kato et al. |
| 2007/0157123 | A1* | 7/2007 | Ikawa et al. ................... 715/816 |

FOREIGN PATENT DOCUMENTS

| JP | 2002-269081 | 9/2002 |
| JP | 2003-16064 | 1/2003 |
| JP | 3578450 | 7/2004 |
| JP | 2004-347459 | 12/2004 |
| JP | 2006-139693 | 6/2006 |
| JP | 2007-43819 | 2/2007 |

* cited by examiner

*Primary Examiner* — Jakieda Jackson
(74) *Attorney, Agent, or Firm* — Antonelli, Terry, Stout & Kraus, LLP.

(57) ABSTRACT

A character string anonymizing apparatus classifies each of a plurality of pieces of text data, each including a character string, into a plurality of kinds of data in accordance with a classification condition, extracts a plurality of words included in each of the plurality of pieces of text data (hereinafter, referred to as linked data) classified into the same kind by the classification, extracts, among word sets including one or more of the extracted words, a word set in which the number of pieces of linked data including all words forming each of the word sets is greater than or equal to a threshold, and anonymizes, among words included in a character string included in each of the plurality of pieces of text data, a word matching at least some of the extracted words and not matching words forming the extracted word set.

9 Claims, 22 Drawing Sheets

| DATA LINKAGE # | TEXT # |
|---|---|
| 0 | 0 |
| 0 | 10 |
| 1 | 2 |
| 1 | 4 |
| 1 | 13 |
| 2 | 5 |
| 3 | 6 |
| ... | ... |

| DATA LINKAGE # | foo@a.com | HUMIDIFIER | ABC-123 | FAN | NOISE | ... |
|---|---|---|---|---|---|---|
| 0 | 2 | 2 | 2 | 1 | 2 | ... |
| 1 | 0 | 0 | 0 | 0 | 0 | ... |
| 2 | 0 | 2 | 1 | 0 | 0 | ... |
| ... | ... | ... | ... | ... | ... | ... |

| TEXT # | From | data | Subject | body | ... |
|---|---|---|---|---|---|
| 0 | "A0" | 2007/4/1 10:00 | PROBLEM WITH HUMIDIFIER | MY NAME IS "A2". I PURCHASED YOUR HUMIDIFIER "A1". "A3" AFTER THE PURCHASE, I STARTED TO HEAR NOISE FROM A FAN ON THE BACK OF THE HUMIDIFIER. THE VOLUME OF THE NOISE IS SO LARGE THAT I HEAR THE NOISE A FEW METERS AWAY FROM THE HUMIDIFIER IN A ROOM WHERE I AM WATCHING TELEVISION. ··· | ... |
| 1 | "B0" | 2007/4/1 10:05 | ABOUT SETTING METHOD | HOW DO YOU DO? MY NAME IS "B1". PLEASE ADVISE ME ABOUT A SETTING METHOD OF YOUR TELEVISION "B2". ··· | ... |
| ... | ... | ... | ... | ... | ... |
| 10 | "X0" | 2007/4/7 22:00 | PROBLEM WITH HUMIDIFIER | I AM "X2". ABOUT PROBLEM WITH HUMIDIFIER "X1" ··· | ... |
| 11 | "Y0" | 2007/4/7 23:30 | PROBLEM WITH PC | MY NAME IS "Y1". I HAVE A QUESTION ABOUT A PC WITH TELEVISION TUNER I PURCHASED THE OTHER DAY. .... | ... |
| ... | ... | ... | ... | ... | ... |

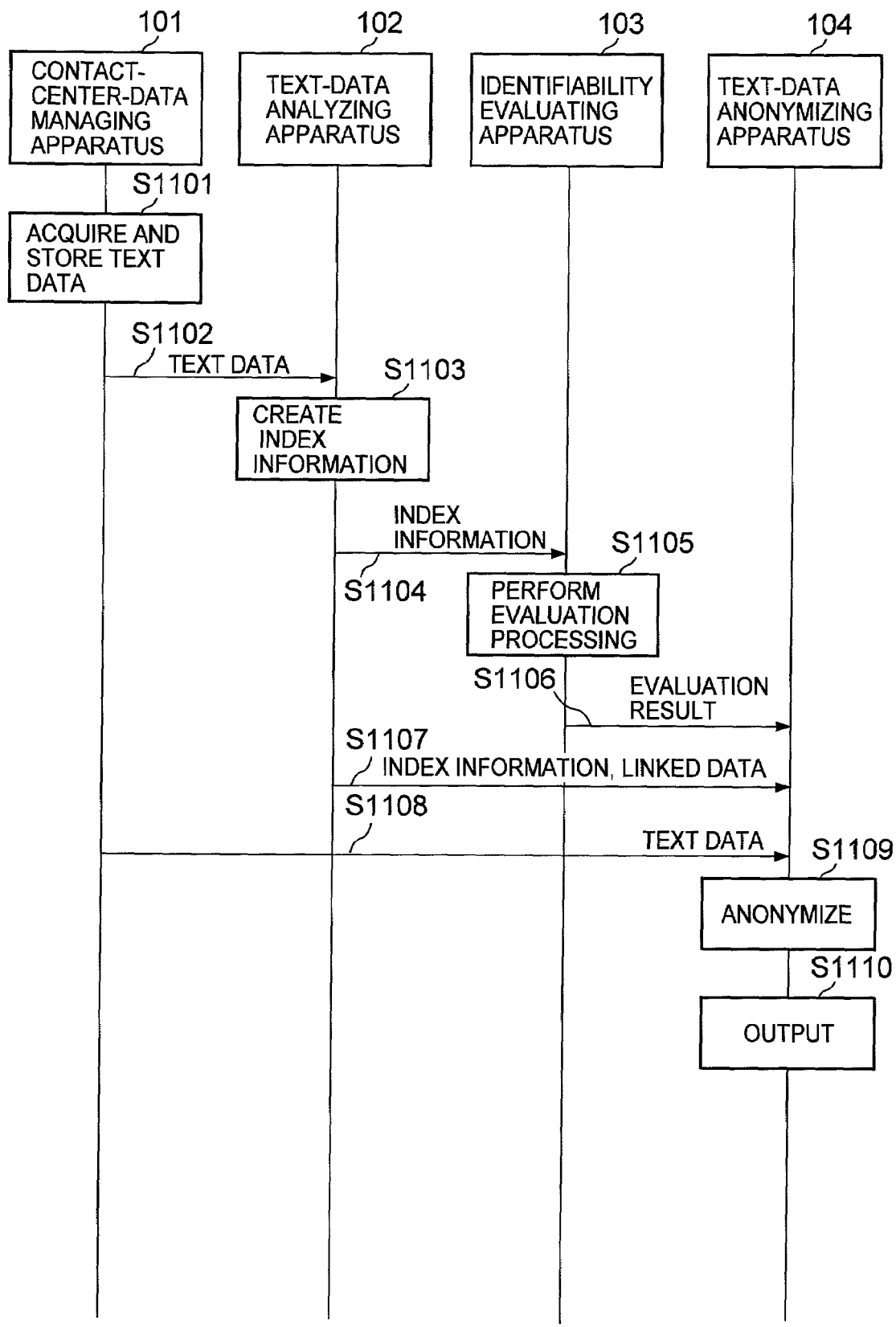

| | |
|---|---|
| TEXT # | 0 |
| From | "A0" |
| data | 2007/4/1 10:00 |
| Subject | PROBLEM WITH HUMIDIFIER |
| body | MY NAME IS "A2". I PURCHASED YOUR HUMIDIFIER "A1". "A3" AFTER THE PURCHASE, I STARTED TO HEAR NOISE FROM A FAN ON THE BACK OF THE HUMIDIFIER. THE VOLUME OF THE NOISE IS SO LARGE THAT I HEAR THE NOISE A FEW METERS AWAY FROM THE HUMIDIFIER IN A ROOM WHERE I AM WATCHING TELEVISION. .... |

BACK  NEXT

| CATEGORY | PART OF SPEECH |
|---|---|
| ALL | — |
| PERSON'S NAME | NOUN |
| PLACE NAME | NOUN |
| ... | ... |

| OPTION |
|---|
| COMMON IN ALL TEXTS |
| COMMON IN EACH TEXT |
| ... |

| REAL NAME WORD | ANONYM WORD | PART OF SPEECH | ... |
|---|---|---|---|
| foo@a.com | A0 | NOUN | ... |
| ABC-123 | A1 | NOUN | ... |
| SATO | A2 | NOUN | ... |
| ONE MONTH | A4 | NOUN | ... |
| ... | ... | ... | ... |
| SATO | B1 | NOUN | ... |
| ... | ... | ... | ... |

| RANK | WORD |
|---|---|
| 1 | HUMIDIFIER |
| 2 | NOISE |
| 3 | A2 |
| ... | ... |

| RANK | WORD |
|---|---|
| 1 | HUMIDIFIER |
| 2 | NOISE |
| 3 | SATO |
| ... | ... |

| MORPHEME | PART OF SPEECH |
|---|---|
| HUMIDIFIER | NOUN |
| ABC-123 | NOUN |
| SATO | NOUN |
| NOISE | NOUN |
| ... | ... |

| TEXT # | 0 |
|---|---|
| From | foo@a.com |
| data | 2007/4/1 10:00 |
| Subject | PROBLEM WITH HUMIDIFIER |
| body | MY NAME IS SATO.<br>I PURCHASED YOUR HUMIDIFIER ABC-123. ONE MONTH AFTER THE PURCHASE, I STARTED TO HEAR NOISE FROM A FAN ON THE BACK OF THE HUMIDIFIER. THE VOLUME OF THE NOISE IS... |

2511

CATEGORY [PERSON'S NAME ▽] — 2522

DETAILS
```
HUMIDIFIER
ABC-123
SATO
...
```
▽ — 2523

OPTION [COMMON IN ALL TEXTS ▽] — 2524

[BACK] [NEXT]

[OK] [CANCEL]

| TEXT # | From | data | Subject | body | ... |
|---|---|---|---|---|---|
| 0 | "A0" | 2007/4/1 10:00 | PROBLEM WITH HUMIDIFIER | MY NAME IS "A2". I PURCHASED YOUR HUMIDIFIER "A1". "A3" AFTER THE PURCHASE, I STARTED TO HEAR NOISE FROM A FAN ON THE BACK OF THE HUMIDIFIER. THE VOLUME OF THE NOISE IS SO LARGE THAT I HEAR THE NOISE A FEW METERS AWAY FROM THE HUMIDIFIER IN A ROOM WHERE I AM WATCHING TELEVISION. ··· | ... |
| 1 | "B0" | 2007/4/1 10:05 | ABOUT SETTING METHOD | HOW DO YOU DO? MY NAME IS "B1". PLEASE ADVISE ME ABOUT A SETTING METHOD OF YOUR TELEVISION "B2". ··· | ... |
| ... | ... | ... | ... | ... | ... |

| TEXT # | From | data | Subject | body | ... |
|---|---|---|---|---|---|
| 0 | "A0" | 2007/4/1 10:00 | PROBLEM WITH HUMIDIFIER | MY NAME IS "A2". I PURCHASED YOUR HUMIDIFIER "A1". "A3" AFTER THE PURCHASE, I STARTED TO HEAR NOISE FROM A FAN ON THE BACK OF THE HUMIDIFIER. THE VOLUME OF THE NOISE IS SO LARGE THAT I HEAR THE NOISE A FEW METERS AWAY FROM THE HUMIDIFIER IN A ROOM WHERE I AM WATCHING TELEVISION. ··· | ... |
| 1 | "B0" | 2007/4/1 10:05 | ABOUT SETTING METHOD | HOW DO YOU DO? MY NAME IS "A2". PLEASE ADVISE ME ABOUT A SETTING METHOD OF YOUR TELEVISION "B2". ··· | ... |
| ... | ... | ... | ... | ... | ... |

CHARACTER STRING ANONYMIZING APPARATUS, CHARACTER STRING ANONYMIZING METHOD, AND CHARACTER STRING ANONYMIZING PROGRAM

INCORPORATION BY REFERENCE

This application claims priority based on a Japanese patent application, No. 2007-181830 filed on Jul. 11, 2007, the entire contents of which are incorporated herein by reference.

BACKGROUND OF THE INVENTION

The present invention relates to anonymization of information.

In these days, there is an increasing social demand for privacy protection. It is indispensable to take into account privacy in information systems of corporations which treat personal information. Although objects which should be protected and ways of protecting them are not established in social convention, for corporations (businesses handling personal information), it is essential to observe at least legislation which relate to personal information protection (hereinafter, referred to as "privacy legislation") in various countries. Typical privacy legislation requires corporations to carry out measures necessary for personal information management such as collection and use of personal information.

Some of privacy legislation, such as EU Directive 2002/58/EC and in some extent the HIPAA itself, require anonymizing personal information for service management, except in cases where it is necessary to identify an individual (data subject).

An easy way of processing personal information anonymization is to remove information with which individuals can be identified from personal information of the individuals, or making the information with which individuals can be identified vague. An example of the former processing is processing to remove names and addresses. An example of the latter is processing, for example, to convert addresses to prefecture units or converting ages to intervals of 10 years.

However, even if such processing is performed, it is possible to identify specific individuals from anonymized personal information by collating the personal information with other information which can be acquired concerning the individuals. Therefore, in anonymizing personal information, it is desirable to ensure security of personal information in terms of identifiability and the like.

Techniques concerning protection of electronic data personal information targeting text data are disclosed in Japanese Patent No. 3578450 (hereinafter, referred to as Patent Document 1) and Japanese Patent Laid-open Publication No. 2002-269081 (hereinafter, referred to as Patent Document 2).

Patent Document 1 discloses a technique for converting a real name word in an electronic document into an anonym word using a real name word/anonym word dictionary created in advance.

Patent Document 2 discloses a technique for anonymizing real names and surrounding wording highly relevant to the real names using a dictionary and syntactic rules prepared in advance.

In the technique disclosed in Patent Document 1, it is necessary to prepare a dictionary of words to be anonymized. Therefore, in the case of a text for which various forms are assumed, for example, when a form is not specifically decided, it is difficult to store all words to be anonymized as a dictionary.

In the technique disclosed in Patent Document 2, as in the technique disclosed in Patent Document 1, it is necessary to prepare a dictionary of words to be anonymized. Therefore, in the case of a text for which various forms are assumed, for example, when a form is not specifically decided, it is difficult to hold all words to be anonymized as a dictionary. Further, in the technique disclosed in Patent Document 2, appearance probabilities of respective words and surrounding wording including the words are calculated. However, when a combination of a word and surrounding wording including the word is rare, the word cannot be anonymized.

SUMMARY OF THE INVENTION

The present invention has been made in view of such circumstances, and it is an object of the present invention to provide a technique which makes it unnecessary to prepare a dictionary of words to be anonymized and makes it possible to appropriately anonymize a word even when a combination of the word and surrounding wording including the word is rare.

According to the present invention, there is provided a character string anonymizing apparatus including: a storage device which stores a plurality of pieces of text data each including a character string; a data linking unit which classifies each of the plurality of pieces of text data into a plurality of kinds of data in accordance with a classification condition; a morpheme analysis unit which extracts a plurality of words included in each of the plurality of pieces of text data (hereinafter, referred to as linked data) classified into the same kind by the classification; an evaluating unit which extracts, among word sets including one or more of the extracted words, a word set in which the number of the pieces of linked data including all words forming each of the word sets is greater than or equal to a threshold; an anonymizing unit which anonymizes, among words included in a character string included in each of the plurality of pieces of text data, a word matching at least some of the extracted words and not matching words forming the extracted word set; and an output processing unit which outputs text data including the anonymized word to an output device.

According to the present invention, it is possible to reduce cost for anonymization. Further, it is possible to appropriately anonymize a word even when a combination of the word and surrounding wording including the word is rare.

These and other benefits are described throughout the present specification. A further understanding of the nature and advantages of the invention may be realized by reference to the remaining portions of the specification and the attached drawings.

BRIEF DESCRIPTION OF THE DRAWINGS

FIG. 5 is a diagram exemplifying a data linkage management table according to the first embodiment of the present invention;

FIG. 6 is a diagram exemplifying an index information table according to the first embodiment of the present invention;

FIG. 10 is a diagram exemplifying an anonymized text data table according to the first embodiment of the present invention;

FIG. 11 is a diagram exemplifying a sequence according to the first embodiment of the present invention;

FIG. 18 is a diagram exemplifying a screen on which anonymized text data is displayed according to the first embodiment of the present invention;

FIGS. 20A and 20B are diagrams exemplifying anonymization condition information according to the second embodiment of the present invention;

FIG. 21 is a diagram exemplifying an anonym association table according to the second embodiment of the present invention;

FIGS. 22A and 22B are diagrams exemplifying an analysis result table and a real name analysis result table according to the second embodiment of the present invention;

FIG. 23 is a diagram exemplifying a part of speech table according to the second embodiment of the present invention;

FIG. 25 is a diagram exemplifying a screen for receiving anonymization conditions according to the second embodiment of the present invention; and FIGS. 26A and 26B are diagrams exemplifying an anonymized text table according to the second embodiment of the present invention.

DESCRIPTION OF THE EMBODIMENTS

Figure 1:
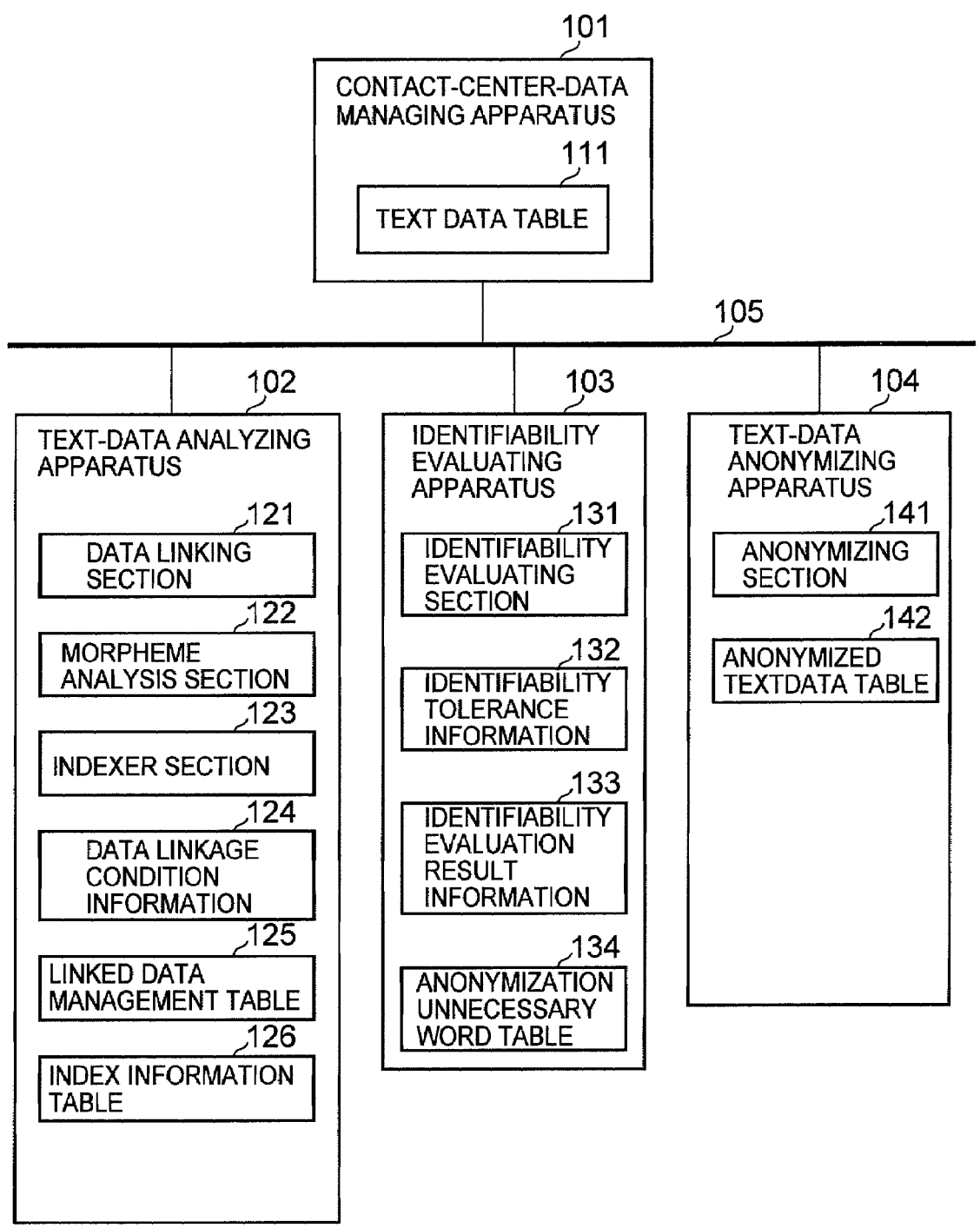
FIG. 1 is a diagram exemplifying a system configuration according to a first embodiment of the present invention.

Embodiments of the present invention will be hereinafter explained in detail with reference to the accompanying drawings.

A technique which mainly protects personal information in the form of electronic text data is explained below. The "personal information" in the embodiments is information concerning individuals and indicates information with which specific individuals can be identified using names, dates of birth, and other data. The personal information includes information which can be easily collated with other kinds of information to make it possible to identify specific individuals. The "information concerning individuals (personal information)" is not limited to information for identifying an individual, such as name, sex, and date of birth, and includes all kinds of information representing facts, judgment, evaluation, and the like, concerning respective attributes such as physical features, assets, job type, and job titles of an individual. These kinds of information may be encrypted or unencrypted. In the following embodiments, an data subject means a specific individual identified by personal information. Moreover, anonymization of personal information means processing for converting personal information of an data subject to prevent the data subject from being identified.

Information to be anonymized may be arbitrary and not specifically limited as long as the information is information in which personal information is possibly included. In the following embodiments, an example in anonymizing information such as inquiries and comments concerning products, services, and the like, from customers collected by electronic mailing, the Web (World Wide Web), call centers, and the like, is explained.

First Embodiment

Initially, a first embodiment of the present invention is explained.

An example of a system configuration according to the first embodiment of the present invention is explained with reference to FIG. 1.

A system according to this embodiment includes a contact-center-data managing apparatus 101, a text-data analyzing apparatus 102, an identifiability evaluating apparatus 103, and a text-data anonymizing apparatus 104 or the like. These apparatuses are coupled via a communication network 105.

Each of the contact-center-data managing apparatus 101, the text-data analyzing apparatus 102, the identifiability evaluating apparatus 103, and the text-data anonymizing apparatus 104 is an arbitrary information processing apparatus such as a personal computer (PC), a server, or a workstation. The communication network 105 is an arbitrary communication network such as the Internet, a private line, a public network, a local area network (LAN), or a wide area network (WAN).

The contact-center-data managing apparatus 101 manages information collected by electronic mail, the Web, call centers, and the like. Various kinds of information collected by electronic mail, the Web, call centers, and the like, are hereinafter referred to as "text data". The text-data analyzing apparatus 102 performs data linkage for text data. "Data linkage" indicates processing for combining one or more pieces of text data, each of which includes personal information of a particular person, into a piece of text data. Data subjected to data linkage and linked to a piece of text data is hereinafter referred to as "linked data". The text-data analyzing apparatus 102 extracts words included in the linked data. Information including words extracted from the linked data and the number of the words included in the respective pieces of linked data is referred to as "index information". Processing for generating index information is referred to as "index establishing processing". The identifiability evaluating apparatus 103 evaluates identifiability of an data subject of data subjected to data linkage by the text-data analyzing apparatus 102. The text-data anonymizing apparatus 104 anonymizes words in text data.

In this embodiment, it is possible to treat a plurality of pieces of text data obtained from the same data subject as one piece of data by subjecting the text data to data linkage using the text-data analyzing apparatus 102. Consequently, even when a plurality of pieces of text data are acquired from the same data subject, it is possible to appropriately anonymize the pieces of text data. Specifically, for example, it is assumed that fifty pieces of text data in total are acquired from thirty different information entities. When text data including a word "X" is acquired from one data subject ten times and when text data including the word "X" is acquired from each of ten different information entities, identifiability of the information entities is different depending on whether the word "X" is included. For example, when the "data linkage" processing is not performed, a percentage of inclusion of the word "X" in acquired text data is 10% and 50% of the same value in the former case and the latter case. However, in the former case, in actuality, text data including the word "X" is acquired from only the same data subject. Therefore, this value is not accurate for identifying the information entities. In the above explanation, only one word "X" is included in the text data. However, the same holds true for combinations of a plurality of words.

Therefore, in this embodiment, by subjecting text data of the same data subject to "data linkage", it is possible to appropriately perform anonymization.

An example of a hardware configuration of each of the contact-center-data managing apparatuses 101, the text-data analyzing apparatus 102, the identifiability evaluating apparatus 103, and the text-data anonymizing apparatus 104 is explained with reference to FIG. 2.

Figure 2:
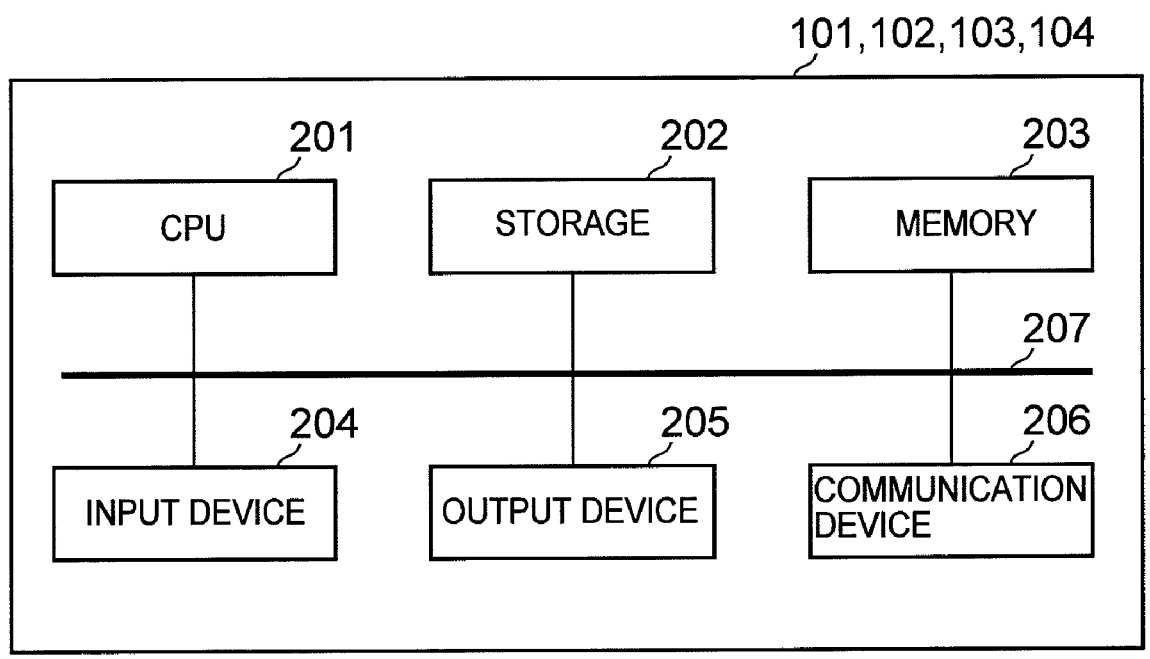
FIG. 2 is a diagram exemplifying a hardware configuration according to the first embodiment of the present invention.

In FIG. 2, each of the contact-center-data managing apparatus 101, the text-data analyzing apparatus 102, the identifiability evaluating apparatus 103, and the text-data anonymizing apparatus 104 includes a central processing unit (CPU) 201, storage 202, a memory 203, an input device 204, an output device 205, and a communication device 206. The CPU 201, the storage 202, the memory 203, the input device 204, the output device 205, the communication device 206, and the like, are connected to one another by a bus 207.

The storage 202 is a storage medium such as a compact disc-recordable (CD-R), a digital versatile disk-random access memory (DVD-RAM), or a silicon disk, a driving device for the storage medium, a hard disk drive (HDD), or the like. The input device 204 is, for example, a keyboard, a mouse, a scanner, or a microphone. The output device 205 is, for example, a display device, a speaker, or a printer. The communication device 206 is, for example, a local area network (LAN) board. Each of the contact-center-data managing apparatus 101, the text-data analyzing apparatus 102, the identifiability evaluating apparatus 103, and the text-data anonymizing apparatus 104 is connected to the communication network 105 via the communication device 206.

Referring back to FIG. 1, the storage 202 of the contact-center-data managing apparatus 101 has a text data table 111. The text data table 111 stores text data of a plurality of information entities. Details of this information are described later.

The CPU 201 of the text-data analyzing apparatus 102 includes a data linking section 121, a morpheme analysis section 122, and an indexer section 123. These are functions realized by the CPU 201 of the text-data analyzing apparatus 102 executing a program (not shown) loaded to the memory 203 of the text-data analyzing apparatus 102. The storage 202 of the text-data analyzing apparatus 102 includes data linkage condition information 124, a linked data management table 125, and an index information table 126. Details of these kinds of information are described later.

The data linking section 121 subjects a plurality of pieces of text data to data linkage in accordance with information included in the data linkage condition information 124. The morpheme analysis section 122 carries out morpheme analysis for each of pieces of the linked data and stores words and the like appearing in a document in the index information table 126. The indexer section 123 acquires information concerning how many times each of the words acquired by the morpheme analysis section 122 appears in each of pieces of the linked data and stores the information in the index information table 126.

The CPU 201 of the identifiability evaluating apparatus 103 includes an identifiability evaluating section 131. This is a function realized by the CPU 201 of the identifiability evaluating apparatus 103 executing a program (not shown) loaded to the memory 203 of the identifiability evaluating apparatus 103. The storage 202 of the identifiability evaluating apparatus 103 includes identifiability tolerance information 132, identifiability evaluation result information 133, and an anonymization unnecessary word table 134. The anonymization unnecessary word table 134 includes information for making it efficient to perform processing for evaluating identifiability of personal information. Details of these kinds of information are described later.

The identifiability evaluating section 131 selects a combination of one or more words among the words in the index information table 126, extracts words where the number of linked data including all the words forming the selected combination is greater than or equal to a value in the identifiability tolerance information 132, and stores the words in the identifiability evaluation result information 133, the anonymization unnecessary word table 134, and the like.

A word the number of appearances of which is to be counted, among words in text data, is hereinafter referred to as "appearing word". A combination of one or more appearing words included in the text data is referred to as "appearing word set". Each appearing word of an appearing word set where the number of linked data, including the appearing word set is greater than or equal to the value in the identifiability tolerance information 132 among appearing word sets, is referred to as "anonymization unnecessary word". The appearing word set itself where the number of linked data including the appearing word is greater than or equal to the value in the identifiability tolerance information 132 is referred to as "anonymization unnecessary word set".

The CPU 201 of the text-data anonymizing apparatus 104 includes an anonymizing section 141. This is a function realized by the CPU 201 of the text-data anonymizing apparatus 104 executing a program (not shown) loaded to the memory 203 of the text-data anonymizing apparatus 104. The storage 202 of the text-data anonymizing apparatus 104 includes an anonymized text data table 142. Details of this information are described later.

The anonymizing section 141 anonymizes appearing words not included in the identifiability evaluation result information 133 and the anonymization unnecessary word table 134 among the appearing words included in each of pieces of the text data in the text data table 111 and stores the anonymized text data in the anonymized text data table 142. An appearing word to be anonymized by the anonymizing section 141 is referred to as "real name word" and a word after being anonymized is referred to as "anonym word".

In FIG. 1, each of the contact-center-data managing apparatus 101, the text-data analyzing apparatus 102, the identifiability evaluating apparatus 103, and the text-data anonymizing apparatus 104 may be managed by, for example, a different corporation. In the system, an example of which is shown in FIG. 1, the different apparatuses have the functions described above. However, the present invention is not limited thereto. One apparatus may have all the functions and all pieces of information described above.

An example of the information described above is explained.

First, an example of the text data table 111 is explained with reference to FIG. 3. In an example shown in FIG. 3, text data is acquired by electronic mail.

Figure 3:
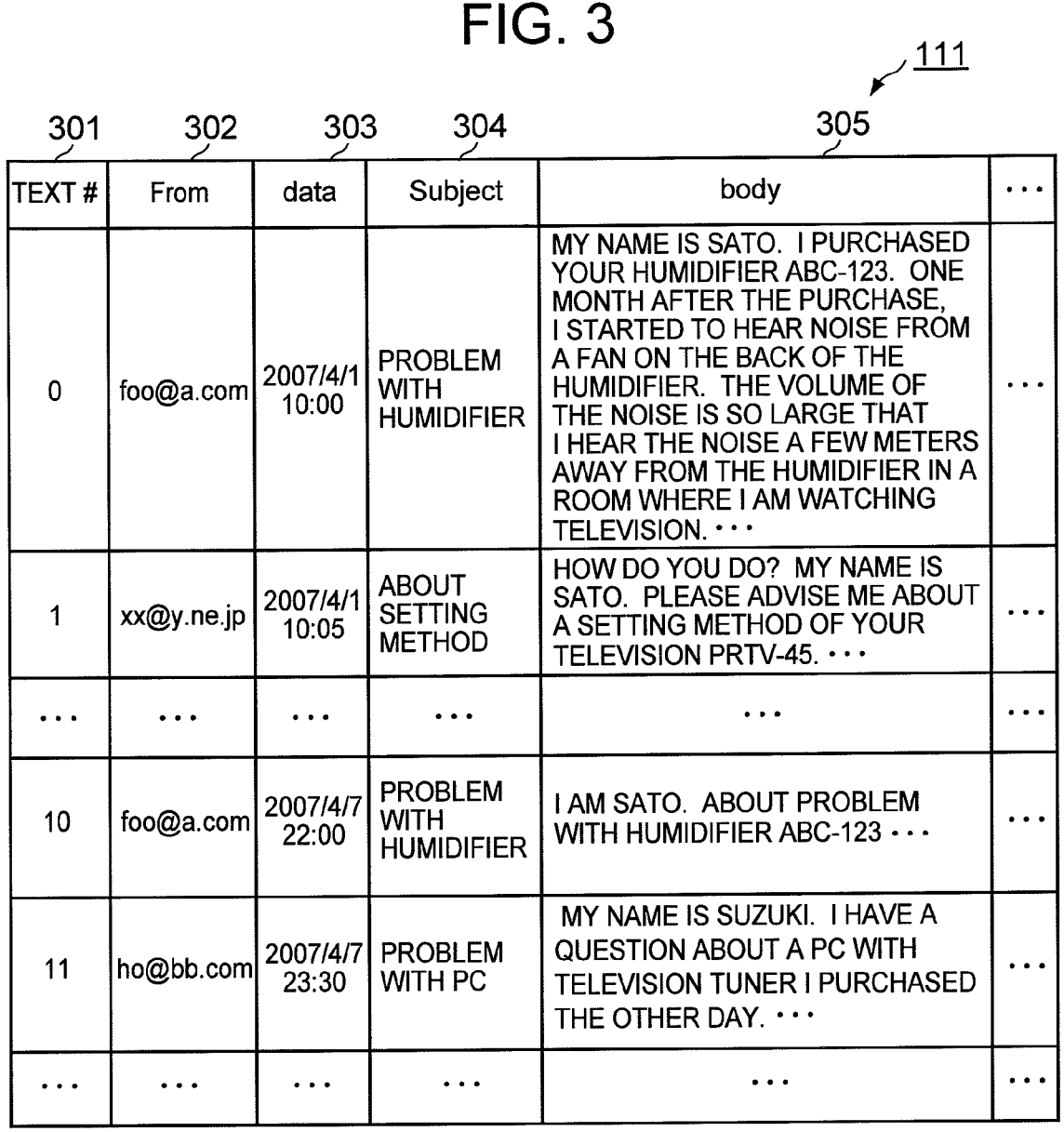
FIG. 3 is a diagram exemplifying a text data table according to the first embodiment of the present invention.

In FIG. 3, the text data table 111 has a plurality of records. Each of the records is text data acquired from each of a plurality of information entities and is one electronic mail. The record has a field 301, a field 302, a field 303, a field 304, a field 305, and the like. The field 301 is an identifier of text data. The field 302 is a header included in the text data. The field 303, the field 304, and the field 305 are time of acquisition of data, subject, and body included in the text data, respectively.

The text data table 111 is stored in the storage 202 of the contact-center-data managing apparatus 101 in advance. A technique for acquiring text data stored in the text data table 111 is arbitrary. For example, electronic mail received from customers may be stored one after another, or text data inputted from the Web or text data inputted by operators in a call center may be stored. The electronic mail and the text data may be mixed and stored.

In the example shown in FIG. 3, the text data table 111 is formed in a table format. However, the present invention is not limited thereto. The text data table 111 may be formed in an arbitrary data format such as extensible markup language (XML).

An example of the data linkage condition information 124 is explained with reference to FIG. 4.

Figure 4:
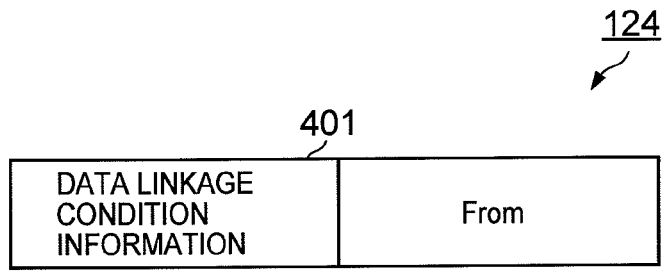
FIG. 4 is a diagram exemplifying data linkage condition information according to the first embodiment of the present invention.

In FIG. 4, the data linkage condition information 124 has data linkage condition information 401. The data linkage condition information 401 is used by the data linking section 121 to designate information for performing data linkage. As described above, "data linkage" of data means processing for combining a plurality of pieces of text data regarding one data subject into one piece of text data. In an example of the data linkage condition information 124 shown in FIG. 4, data linkage is performed with reference to "From" which is information described in the header, i.e., an email address of an data subject. Evaluation of identifiability described later is applied to linked data. In other words, the data linkage condition information 401 indicates in what kind of data unit the identifiability is judged. Therefore, in the example shown in FIG. 4, the identifiability indicates that an data subject is distinguished for each email addresses.

The data linkage condition information 401 is not limited to "From". It is possible to designate one or more pieces of arbitrary information included in text data. Specifically, for example, when the text data includes attribute information such as a customer identification number, name, address, and telephone number, one or more pieces of these kinds of attribute information may be set as the data linkage condition information 401. For example, one or more arbitrary words included in the text data may be set as the data linkage condition information 401. In other words, the data linkage condition information 401 only has to be information for classifying each of a plurality of pieces of text data including personal information of different information entities into data including personal information of the same individual.

It is assumed that the data linkage condition information 124 is stored in the storage 202 of the text-data analyzing apparatus 102 in advance.

An example of the linked data management table 125 is explained with reference to FIG. 5.

In FIG. 5, each of records in the linked data management table 125 has a field 501, a field 502, and the like. The field 501 is an identifier of linked data. The field 502 is an identifier of text data forming linked data indicated by a value of the field 501 of the same record. This identifier is the same as the identifier of each of the pieces of text data in the text data table 111.

Details of an operation for creating the linked data management table 125 are described later.

An example of the index information table 126 is explained with reference to FIG. 6.

In FIG. 6, each of records in the index information table 126 has a field 601, a field 602, a field 603, a field 604, a field 605, a field 606, and the like.

In a record of a first row of the index information table 126, the fields 602, 603, 604, 605, and 606 are all appearing words included in each piece of text data. In the example shown in FIG. 6, only the fields 602, 603, 604, 605, and 606 are shown. However, the present invention is not limited thereto. In the index information table 126, each of all the appearing words extracted from text data in the text data table 111, an example of which is shown in FIG. 3, is stored in each of the fields. The index information table 126 has fields equivalent to a total number of the identifiers of linked data and all the appearing words extracted from the text data in the text data table 111, an example of which is shown in FIG. 3. In each of records in the next and subsequent rows of the index information table 126, the field 601 is an identifier of the linked data. The fields 602, 603, 604, 605, and 606 represent the number of appearances of appearing words of each of field values in a first row in the linked data in the field 601. Specifically, in the example shown in FIG. 6, for example, in linked data of the field 601 "0", appearing words "foo@a.com", "humidifier", "ABC-123", "fan", and "noise" shown in the fields 602, 603, 604, 605, and 606 appear "twice", "twice", "twice", "once", and "twice", respectively.

Details of an operation for creating the index information table 126 are described later.

An example of the identifiability tolerance information 132 is explained with reference to FIG. 7.

Figure 7:
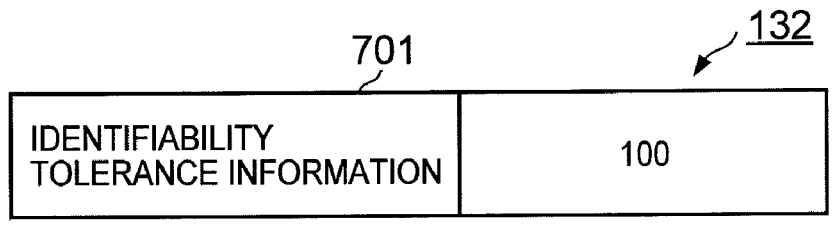
FIG. 7 is a diagram exemplifying identifiability tolerance information according to the first embodiment of the present invention.

In FIG. 7, the identifiability tolerance information 132 has identifiability tolerance information 701. The identifiability tolerance information 701 indicates a tolerance of the number of times all words forming each of appearing word sets appear in each of pieces of linked data. When an appearing word set included in the linked data is greater than or equal to a value of the identifiability tolerance information 701, the appearing word set is a safe set with low identifiability and it is considered that, even if an appearing word included in the appearing word set is disclosed, it is difficult to identify an data subject. Conversely, when the number of times of appearance of a certain appearing word set is smaller than the value of the identifiability tolerance information 701, the appearing word set is regarded as a dangerous set with high identifiability.

It is assumed that the identifiability tolerance information 132 is stored in the storage 202 of the identifiability evaluating apparatus 103 in advance.

An example of the identifiability evaluation result information 133 is explained with reference to FIGS. 8A and 8B.

The identifiability evaluation result information 133 indicates anonymization unnecessary words. In this embodiment, it is assumed that the identifiability evaluation result information 133 has a different table for each of numbers of anonymization unnecessary words included in an anonymization unnecessary word set. This table is hereinafter referred to as "identifiability evaluation result information table 801". In other words, it is assumed that the identifiability evaluation result information 133 has the identifiability evaluation result information tables 801 equivalent to the number of appearing words included in the anonymization unnecessary word set. When each of the identifiability evaluation result information tables 801 is distinguished and explained, a symbol is affixed to the reference numeral in such a manner as "identifiability evaluation result information table 801*a*".

Figure 8A:
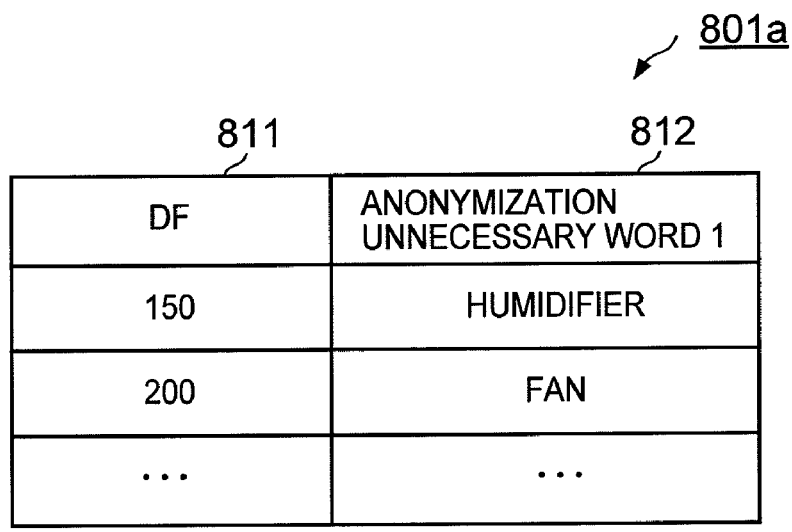
FIGS. 8A and 8B are diagrams exemplifying examples of identifiability evaluation result information according to the first embodiment of the present invention.

In FIG. 8A, the identifiability evaluation result information table 801*a* stores information concerning an anonymization unnecessary word set including one anonymization unnecessary word. Each of records of the identifiability evaluation result information table 801*a* has a field 811, a field 812, and the like. The field 811 is a number document frequency (DF) of linked data in which one anonymization unnecessary word indicated by the field 812 appears. The field 812 is an anonymization unnecessary word. Specifically, for example, in the case of FIG. 8A, the number of linked data including the field 812 "humidifier" is indicated as the field 811 "150".

Figure 8B:
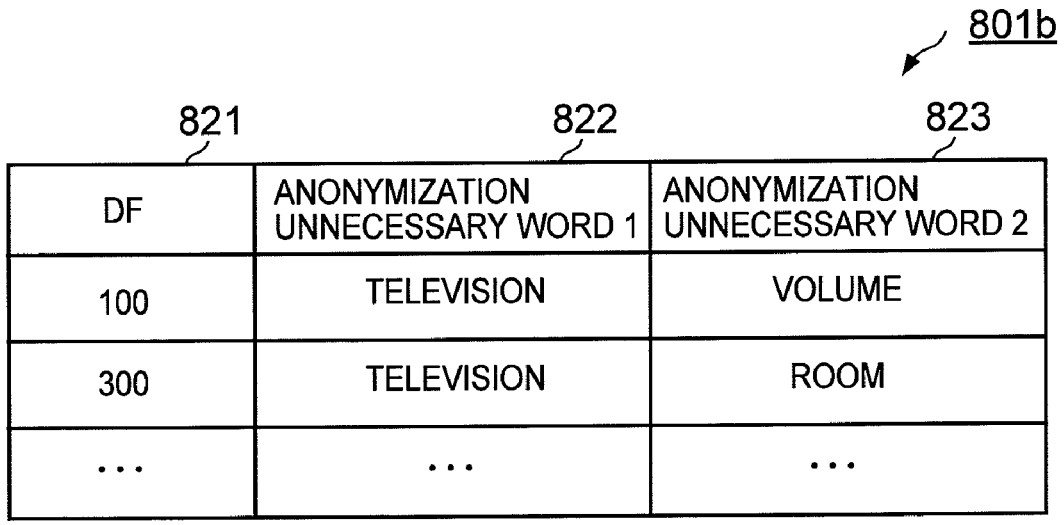

In FIG. 8B, the identifiability evaluation result information table 801*b* stores information concerning an anonymization unnecessary word set including two anonymization unnecessary words. Each record of the identifiability evaluation result information table 801*b* has a field 821, a field 822, a field 823, and the like. The field 821 is a number DF of linked data in which both of two anonymization unnecessary words indicated by the field 822 and the field 823 appear. The field 822 and the field 823 each are an anonymization unnecessary word. Specifically, for example, in the case of FIG. 8B, the number of pieces of linked data including both of the field 822 "television" and the field 823 "volume" is indicated as the field 821 "100".

Details of an operation for creating the identifiability evaluation result information table 801 are described later.

An example of the anonymization unnecessary word table 134 is explained with reference to FIG. 9.

Figure 9:
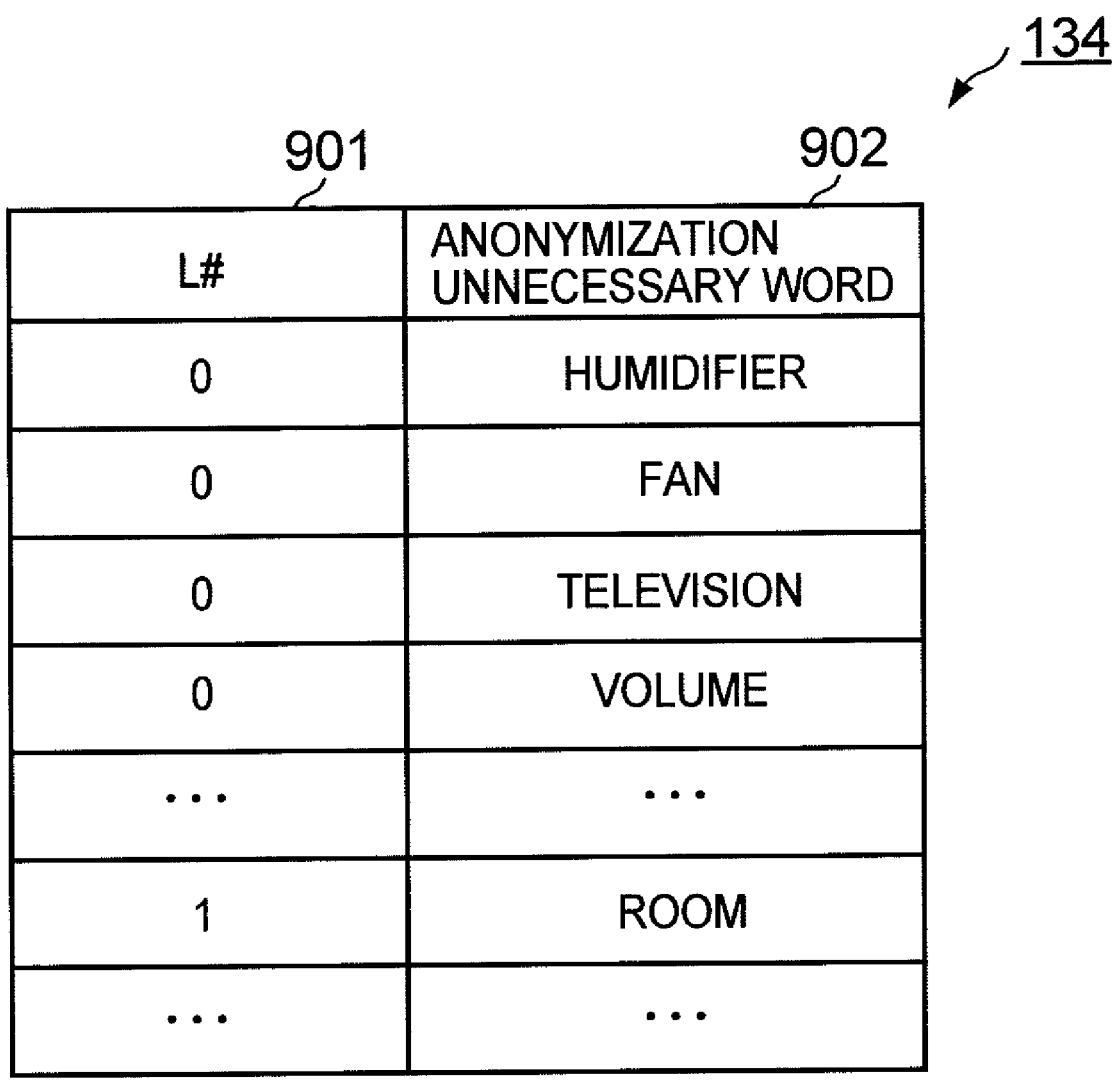
FIG. 9 is a diagram exemplifying an anonymization unnecessary word table according to the first embodiment of the present invention.

In FIG. 9, each of records of the anonymization unnecessary word table 134 has a field 901, a field 902, and the like. The field 901 is a processing loop number. The field 902 represents an anonymization unnecessary word.

Details of an operation for creating the anonymization unnecessary word table 134 are described later.

An example of the anonymized text data table 142 is explained with reference to FIG. 10.

In FIG. 10, the anonymized text data table 142 is created by anonymizing the words in the text data table 111. When an appearing word set included in each of the records of the text data table 111 is judged as a dangerous set with high identifiability by evaluation processing described later, each of appearing words of the appearing word set is anonymized. In the example shown in FIG. 10, a real name word "foo@a.com", a real name word "ABC-123", and a real name word "Sato" are anonymized. In other words, in the example shown in FIG. 10, the real name word "foo@a.com" is replaced with an anonym word "A0", the real name word "ABD-123" is replaced with an anonym word "A1", and the real name word "Sato" is replaced with an anonym word "A2".

In the example shown in FIG. 10, each of anonym words is put in quotation marks. However, this is only for convenience of explanation. In an actual output, the quotation marks may be present or absent. In other words, it is arbitrary to clearly indicate which word is anonymized. Means for clear indication is not limited to the quotation marks and may be an arbitrary unit such as to change a color or a font.

Details of an operation for creating the anonymized text data table 142 are described later.

An example of an operation according to this embodiment is explained.

First, an example of a sequence is explained with reference to FIG. 11.

In FIG. 11, the contact-center-data managing apparatus 101 collects text data and stores the text data in the text data table 111 (S1101). As described above, in the text data table 111, one text data (received email) is stored in one record.

The text-data analyzing apparatus 102 stores a copy of the text data table 111 read from the contact-center-data managing apparatus 101 in the memory 203 of the text-data analyzing apparatus 102 (S1102). A trigger for starting this processing is not specifically limited. However, the processing is started, for example, when the number of data added to or updated in the text data table 111 reaches the number greater than or equal to a predetermined number or when a predetermined date and time elapses after previous execution of processing.

The data linking section 121 of the text-data analyzing apparatus 102 performs data linkage processing to create the linked data management table 125. The morpheme analysis section 122 applies morpheme analysis to linked data. The indexer section 123 performs index establishment processing. Consequently, the index information table 126 is created (S1103). Details of this processing are described later.

The identifiability evaluating apparatus 103 stores a copy of the index information table 126 read from the text-data analyzing apparatus 102 in the memory 203 of the identifiability evaluating apparatus 103 (S1104). In the following explanation, when a table copied by the processing in S1104 is specifically distinguished, the table is referred to as "index information table 126'". The index information table 126' is a table for work. A technique for realizing processing for storage and search in the index information table 126' may be arbitrary. For example, a tool disclosed in "Akihiko Takano, et al.: Development of a Generic Engine for Transposable Association and Application to Analysis of Large Corpora, Information-Technology Promotion Agency, Creative Information Technology Promotion Project, 2001 Project Report" may be used. In the following explanation, a value of a "j"-th column in an "i"-th row in the index information table 126' is represented as "D". Note that "i" is an integer greater than or equal to 0 and equal to or smaller than (N−1) and "j" is an integer greater than or equal to 0 and equal to or smaller than (M−1). "N" is the number of records in the index information table 126'. "M" is a total number of fields representing appearing words in the index information table 126'.

Timing for staring this processing may be arbitrary after S1103 is executed. The processing may be started, for example, when an administrator instructs the start using the input device 204 or the like of the identifiability evaluating apparatus 103 or when the text-data analyzing apparatus 102 transmits information for requesting execution of evaluation processing to the identifiability evaluating apparatus 103 after finishing the processing in S1103.

The identifiability evaluating apparatus 103 acquires, with reference to the index information table 126', a combination which appearing words can take and evaluates identifiability concerning the acquired combination (S1105). Consequently, the identifiability evaluation result information 133, the anonymization unnecessary word table 134, and the like are created. Details of this operation are described later.

The text-data anonymizing apparatus 104 stores a copy of the identifiability evaluation result information 133 (the identifiability evaluation result information table 801) read from the storage 202 of the identifiability evaluating apparatus 103 in the memory 203 (S1106). When the identifiability evaluation result information 133 (the identifiability evaluation result information table 801) of the identifiability evaluating apparatus 103 and the identifiability evaluation result information 133 (the identifiability evaluation result information table 801) on the memory 203 of the text-data anonymizing apparatus 104 are specifically distinguished from each other, that of the text-data anonymizing apparatus 104 is represented as "identifiability evaluation result information 133' (identifiability evaluation result information table 801')". An "m"-th identifiability evaluation result information table 801 in the identifiability evaluation result information 133 is represented as "SW". Note that "m" is an integer greater than or equal to 0 and smaller than M. As described above, "M" is the number of appearing words. An anonymization unnecessary word set is included in each of records of SW.

The text-data anonymizing apparatus 104 stores copies of the index information table 126 and the linked data management table 125 read from the text-data analyzing apparatus 102 in the memory 203 of the text-data anonymizing apparatus 104 (S1107). As in S1104, in the following explanation, when the index information table 126 on the memory 203 of the text-data anonymizing apparatus 104 is distinguished, the index information table 126 is referred to as "index information table 126'". In the following explanation, when the linked data management table 125 on the memory 203 of the text-data anonymizing apparatus 104 is distinguished, the linked data management table 125 is referred to as "linked data management table 125'".

The text-data anonymizing apparatus 104 stores a copy of the text data read from the text data table 111 stored in the contact-center-data managing apparatus 101 in the memory 203 (S1108). The number of text data read in one processing in S1108 may be arbitrary. However, in this explanation, the text-data anonymizing apparatus 104 reads one piece of text data in the processing in S1108, applies the processing in S1109 and S1110 to be described later to the read text data, and repeats the processing in S1108 to S1110 a plurality of times to thereby anonymize a plurality of pieces of text data. However, the present invention is not limited to this. The text-data anonymizing apparatus 104 may read a plurality of pieces of text data in the processing in S1108 and applies the processing in S1109 and S1110 to the read text data.

The text-data anonymizing apparatus 104 anonymizes, with reference to each of anonymization unnecessary word sets stored in each of identifiability evaluation result information tables 801', an appearing word not corresponding to the anonymization unnecessary word set among appearing words included in the text data copied in the memory 203 in the processing in S1108 (S1109). Details of S1109 are described later.

The text-data anonymizing apparatus 104 outputs a result of the processing in S1109 to the anonymized text data table 142 on the storage 202 (S1110). Information in the anonymized text data table 142 is outputted to the output device 205 of the text-data anonymizing apparatus 104 or an output device (not shown) of an information terminal such as a PC, for example, coupled to the communication network 105.

Processing in each of the apparatuses alone is explained.

First, the processing in S1103 is explained with reference to FIG. 12. As described above, at a stage when the processing in S1103 is started, the text data table 111 acquired from the contact-center-data managing apparatus 101 is stored in the memory 203 of the text-data analyzing apparatus 102.

Figure 12:
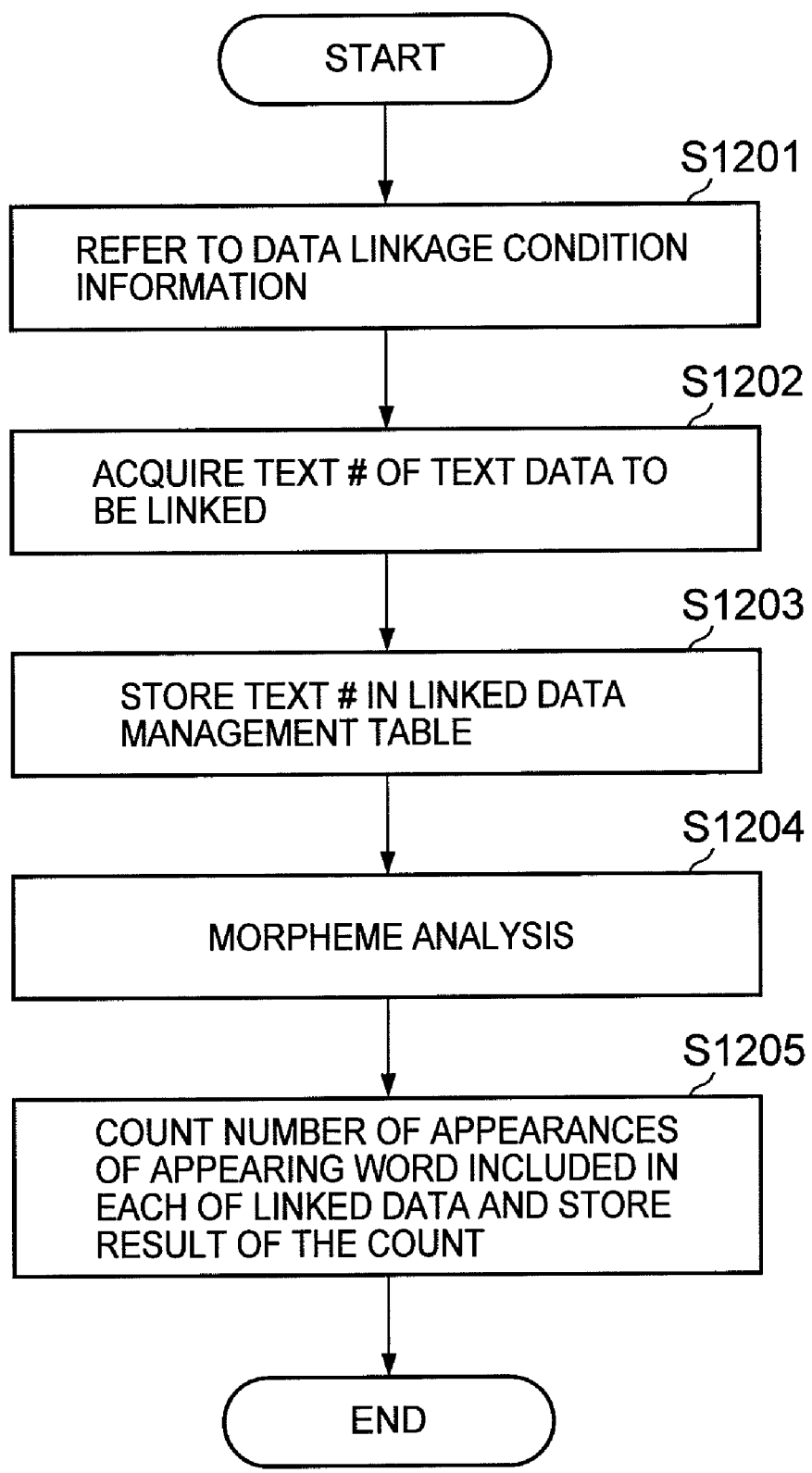
FIG. 12 is a flowchart for exemplifying an operation of a text-data analyzing apparatus according to the first embodiment of the present invention.

In FIG. 12, the data linking section 121 of the text-data analyzing apparatus 102 acquires data linkage condition information with reference to the data linkage condition information 124 (S1201). The data linking section 121 selects, with reference to each of the records in the text data table 111 in the memory 203, text data (a record) forming identical linked data in accordance with the data linkage condition information acquired in S1201 and acquires a text number of the selected text data (S1202). For that purpose, the data linking section 121 selects, with reference to each of the records in the text data table 111, a record of text data to be linked in accordance with information stored in the data linkage condition information 124 and acquires a value of the field 301 of the selected record.

The data linking section 121 stores an identifier of the linked data and the text number of the text data forming the linked data (S1203). For that purpose, the data linking section 121 stores the identifier of the linked data and the text number of the text data forming the linked data acquired in the processing in S1203 in each of the field 501 and the field 502 of each of the records in the linked data management table 125. The identifier of the linked data may be arbitrary. However, in this explanation, it is assumed that the identifier is a serial number.

Specifically, for example, in the case of the data linkage condition information 124, an example of which is shown in FIG. 4, the identifier is the data linkage condition information 401 "From". In this case, the data linking section 121 assumes that text data having the same value of the data linkage condition information 401 "From" among text data of each of the records of the text data table 111, an example of which is shown in FIG. 3, is text data forming identical linked data. Specifically, for example, in the case of the text data table 111, an example of which is shown in FIG. 3, the data linking section 121 assumes that records, a value of the field 302 of which is "foo@a.com", form identical linked data. Therefore, the data linking section 121 acquires values "0", "10", and the like of the field 301 of the records, a value of the field 302 of which is "foo@a.com", from the text data table 111, an example of which is shown in FIG. 3. The data linking section 121 adds records having respective values of the field 501 and the field 502 "0" and "0" and records having respective values of the field 501 and the field 502 "0" and "10" to the linked data management table 125. The data linking section 121 applies the same processing to the field 302 "XX@y.ne.jp" and the like.

The morpheme analysis section 122 applies morpheme analysis processing to each of the linked data (S1204). The morpheme analysis indicates analysis for resolving a text into elements as minimum units of a character string (morphemes) and judging a part of speech of each of the resolved morphemes. Parts of speech judged by the morpheme analysis are, in the case of Japanese, for example, "noun", "verb", "particle", and the like and more detailed parts of speech such as "verb/independent" and "particle/conjunctive particle". A technique for realizing the morpheme analysis processing is the same as the conventional technique and is not specifically limited. It is advisable to use, for example, a tool disclosed in "Yuji Matsumoto, et al.: NAIST Technical Report, NAIST-IS-TR97007, February 1997".

The indexer section 123 sets at least some of the morphemes acquired in the processing in S1204 as "appearing words", counts the number of appearances of each of the appearing words for each of the linked data, and stores a result of the counting in the index information table 126 (S1205).

The morphemes set as the appearing words are not specifically limited. However, in this explanation, it is assumed that morphemes, a part of speech of which is "noun", are appearing words. The indexer section 123 stores an identifier of the linked data in a first field of each of the records of the index information table 126 and stores the appearing word in each of second and subsequent fields of a first record. The indexer section 123 counts, for each of the linked data, the number of stored appearing words included in the second and subsequent fields of the first record of the index information table 126 and stores the number in each of the second and subsequent records of the index information table 126. The indexer section 123 outputs the index information table 126 created in this way to the storage 202.

Specifically, an example in creating one piece of linked data from text numbers "0" and "10" of the text data table 111, an example of which is shown in FIG. 3, as described above is explained. In this case, the indexer section 123 sets each of words "foo@a.com", "humidifier", "ABC-123", "fan", and "noise" included in the linked data as an appearing word. The indexer section 123 acquires the number of times of appearance "2", "2", "2", "1", and "2" of each of the appearing words "foo@a.com", "humidifier", "ABC-123", "fan", and "noise" from the linked data. The indexer section 123 stores "foo@a.com", "humidifier", "ABC-123", "fan", and "noise" in each of the second and subsequent fields of the first record of the index information table 126. Moreover, the indexer section 123 stores the identifier "0" of the linked data and the number of appearances "2", "2", "2", "1", and "2" of each of the appearing words in each of the fields of the second record of the index information table 126.

This index establishment processing is the same as the conventional technology and is not specifically limited. It is advisable to use, for example, a tool disclosed in "Akihiko Takano, et al.: Development of a Generic Engine for Transposable Association and Application to Analysis of Large Corpora, Information-Technology Promotion Agency, Creative Information Technology Promotion Project, 2001 Project Report".

Figure 13:
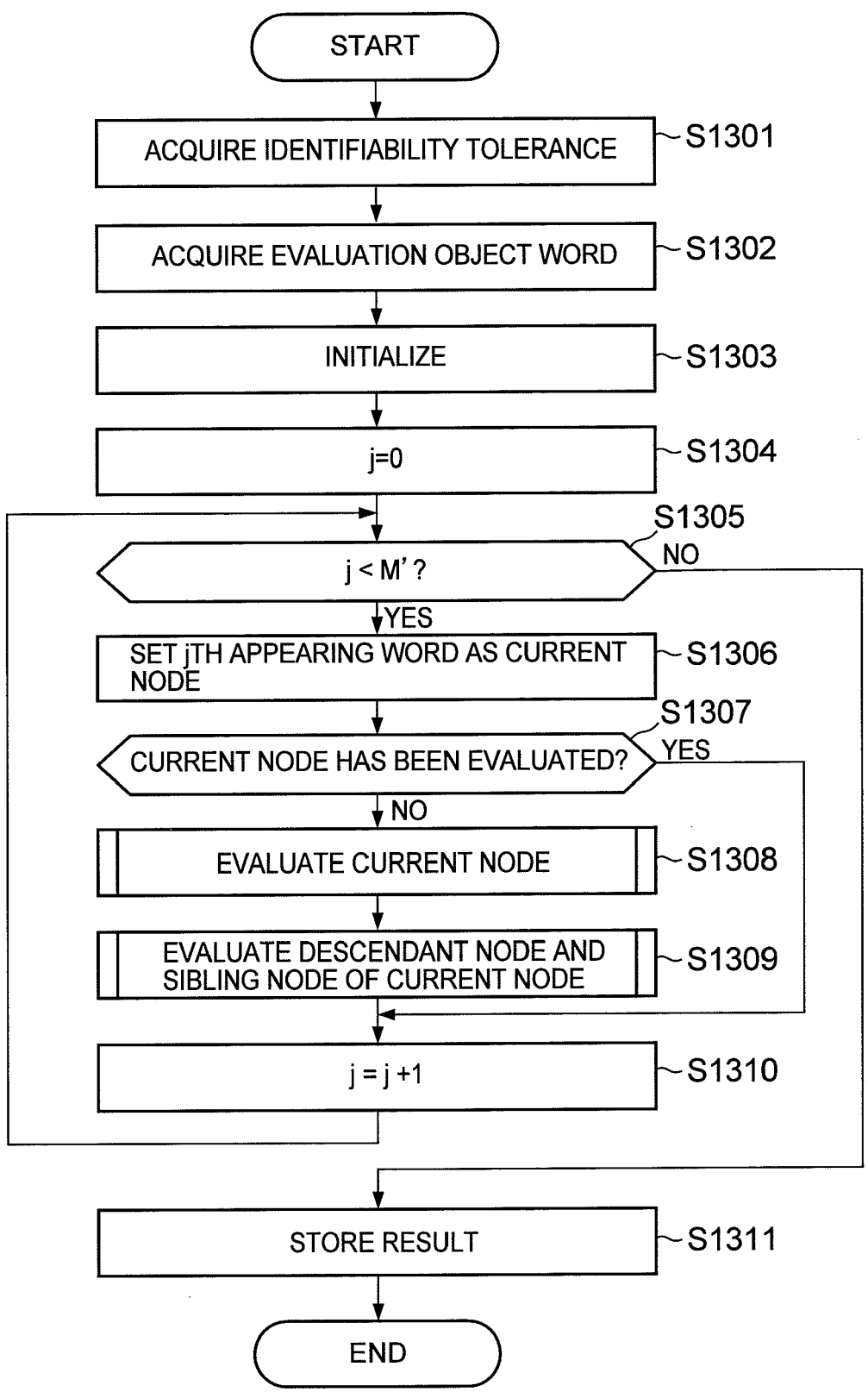
FIG. 13 is a flowchart for exemplifying an operation of an identifiability evaluating apparatus according to the first embodiment of the present invention.

Details of the operation in S1105 are explained with reference to FIG. 13. As described above, in the processing in S1104, the identifiability evaluating apparatus 103 acquires the index information table 126 from the text-data analyzing apparatus 102 and stores the index information table 126 in the memory 203 of the identifiability evaluating apparatus 103. As described above, when the index information table 126 stored in the memory 203 of the identifiability evaluating apparatus 103 is distinguished, the index information table 126 is referred to as "index information table 126'".

First, the identifiability evaluating section 131 of the identifiability evaluating apparatus 103 reads a value of the identifiability tolerance information 701 from the identifiability tolerance information 132 on the storage 202 and set the read value as a value of a variable "K" (S1301). Specifically, for example, in the case of the identifiability tolerance information 132, an example of which is shown in FIG. 7, the identifiability evaluating section 131 sets K to 100.

The identifiability evaluating section 131 acquires an evaluation object word (S1302). For that purpose, the identifiability evaluating section 131 acquires an evaluation object word from the index information table 126'. For example, the identifiability evaluating section 131 counts, for each of fields indicating appearing words of the index information table 126', the number of records having the number of appearances greater than or equal to 1. The identifiability evaluating section 131 stores a number indicating each of the appearing words in the fields having the counted number of records greater than or equal to the variable "K" in an array "W". The array "W" is an array with a size "M". Each of elements of the array "W" is indicated as "W". "m" is an integer greater than or equal to 0 and smaller than M as described above. The number indicating each of the appearing words means an order of arrangement of the fields representing the appearing words in the index information table 126'. In the following processing, each of the identifiability evaluation result information 133 and the anonymization unnecessary word table 134 is managed by numbers allocated to appearing words instead of character strings representing the appearing words. The identifiability evaluating section 131 stores the number of appearing words stored in the array "W" in a variable "M'".

Specifically, for example, in the case of the index information table 126 (the index information table 126'), an example of which is shown in FIG. 6, each of the appearing words "foo@a.com", "humidifier", "ABC-123", "fan", and "noise" is indicated by numbers "0", "1", "2", "3", and "4". First, the identifiability evaluating section 131 counts, for each of fields indicating the appearing words, the number of records with the number of appearances greater than or equal to 1. For example, the following explanation is limited to the case of only linked data having data linkage numbers "0" to "2" indicated by the identifiability evaluation result information 133, an example of which is shown in FIG. 6. Linked data, a value of a data linkage number 601 of which is "0", corresponds to a record having the number of appearances greater than or equal to 1 in the field 602 "foo@a.com". Therefore, the identifiability evaluating section 131 acquires "1" as the number of the record. Similarly, linked data having values of data linkage number 601 "0" and "2" correspond to records having the number of appearances greater than or equal to 1 in the field 604 "ABC-123". Therefore, the identifiability evaluating section 131 acquires "2" as the number of the records. For example, when the number of records including each of "foo@a.com" and "ABC-123" among the five appearing words is smaller than "K=100" and the number of records including each of other words is greater than or equal to "K=100", the identifiability evaluating section 131 stores numbers of "humidifier", "fan", and "noise" in the array "W" in order of processing. Specifically, the identifiability evaluating section 131 stores "W=1", "W=3", and "W=4". The identifiability evaluating section 131 sets M' to 2.

The identifiability evaluating section 131 initializes the table structure of each of the identifiability evaluation result information tables 801 of the identifiability evaluation result information 133 and the table structure of the anonymization unnecessary word table 134 (S1303). Specifically, the identifiability evaluating section 131 establishes "M" identifiability evaluation result information tables 801 with empty records in the memory 203 of the identifiability evaluating apparatus 103. As indicated by examples shown in FIGS. 8A and 8B, each of the records of these tables includes one or more fields in which appearing words are stored and one field in which the number of linked data including the appearing words is stored. In other words, the identifiability evaluating section 131 creates the identifiability evaluation result information tables 801 each including one field in which the number of linked data is stored and one to M fields in each of which a word is stored. As indicated by an example shown in FIG. 9, the identifiability evaluating section 131 establishes the anonymization unnecessary word table 134 having the field 901 and the field 902 and empties records.

The identifiability evaluating section 131 evaluates an appearing word set included in the linked data. The appearing word set according to this embodiment represented as a tree is explained with reference to a tree, an example of which is shown in FIG. 14.

Figure 14:
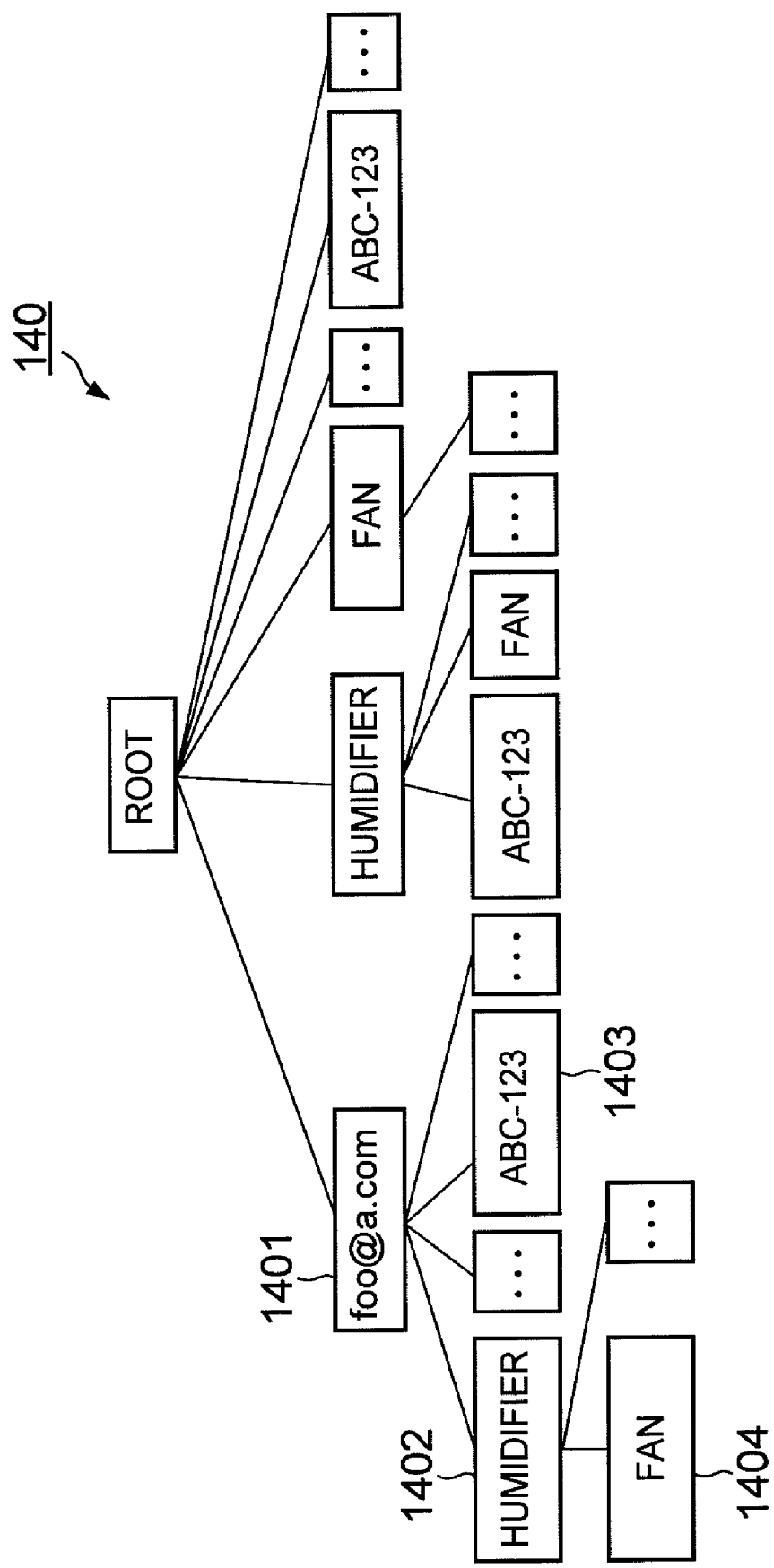
FIG. 14 shows exemplifying a tree diagram for explaining a combination of appearing words for identifiability evaluation according to the first embodiment of the present invention.

In FIG. 14, a search tree 1400 indicates an example of an appearing word set (combination of word) in the index information table 126, an example of which is shown in FIG. 6. The tree 1400 has a plurality of nodes and a path from the root node to a certain node represents an appearing word set. For example, in the case of the tree 1400 shown in FIG. 14, a node 1401 indicates an appearing word set including one appearing word "foo@a.com". A node 1402 indicates an appearing word set including two appearing words "foo@a.com" and "humidifier". A node 1403 indicates an appearing word set including two appearing words "foo@a.com" and "ABC-123". A root node is a management node of the tree 1400.

In the following explanation, the number of arcs present between a certain node and the root node is referred to as depth of the node. The depth of the root node is set to "zero". A node group present on a path between a certain node and the root node is referred to as ancestor node of the node. An ancestor node adjacent to a certain node on a path is referred to as parent node of the node. The number of parent node of one node excluding the root node is one. A node having depth larger than a certain node by one and adjacent to the certain node is referred to as child node. The number of child node of one node is greater than or equal to 0. When there is another node B having a parent node common to a certain node A, the node B is referred to as sibling node of the node A. A node having no child node is referred to as leaf node. Specifically, for example, in the case of the tree 1400, a parent node of the node 1402 is the node 1401. A sibling node of the node 1402 is the node 1403. A child node of the node 1402 is a node 1404.

In the following explanation, processing for calculating the number of records of linked data having an appearing word set represented by nodes in the index information table 126' is referred to as node evaluation processing. A node, for which the number of records calculated by the node evaluation processing is greater than or equal to the value stored in the identifiability tolerance information 132, is referred to as "safe node". A node which is not the safe node is referred to as "dangerous node". An appearing word set corresponding to the safe node is referred to as "anonymization unnecessary word set" and an appearing word forming the anonymization unnecessary word set is referred to as "anonymization unnecessary word".

In this embodiment, in the node evaluation processing explained below, nodes on a search tree are evaluated in order in accordance with rules described below.

Rule (1): The root node is set as a start point.

Rule (2): At a point when evaluation of a certain node is finished, when a child node and a sibling node as processing objects are present, the child node is evaluated first.

When a plurality of child nodes are present in the rule (2), a child node having a smaller integer allocated to an appearing word represented by the child node is evaluated earlier. When a plurality of sibling nodes are present in the rule (2), a sibling node having a smaller integer allocated to an appearing word represented by the sibling node is evaluated earlier.

Referring back to FIG. 13, after the processing in S1303, the identifiability evaluating section 131 initializes a loop variable "j" (S1304). Specifically, the identifiability evaluating section 131 sets the loop variable j to 0. The identifiability evaluating section 131 judges whether j is smaller than M' (S1305).

As a result of the judgment in S1305, when j is smaller than M', the identifiability evaluating section 131 sets a current node (S1306). Specifically, the identifiability evaluating section 131 sets a variable "P" for referring to the current node to j. Note that, because an appearing word with an appearance frequency which is greater than or equal to "K" is a processing object, a number of an appearing word representing the current node is referred to by W.

The identifiability evaluating section 131 judges whether an appearing word corresponding to the current node has been processed (S1307). For that purpose, the identifiability evaluating section 131 judges, with reference to each of the records in the anonymization unnecessary word table 134, whether an appearing word, a value of the field 501 "L#" of which is smaller than "j" and a value of the field 502 of which matches "W", is included in the anonymization unnecessary word table 134. When a relevant appearing word is included, the identifiability evaluating section 131 judges that the appearing word corresponding to the current node has been processed.

As a result of the judgment in S1307, when it is judged that an item value corresponding to the current node has not been processed, the identifiability evaluating section 131 evaluates the current node (S1308). Details of this operation are described later.

The identifiability evaluating section 131 evaluates a descendant node and a sibling node of the current node (S1309). Note that, in the judgment of a sibling node, a descendant node group having a jth appearing word at the depth 1 in the array "W" is set as an evaluation object. Details of this operation are described later.

The identifiability evaluation result information table 801 is generated by the processing in S1308 and S1309.

The identifiability evaluating section 131 increments j to j+1 (S1301) and performs the processing in S1305 and the subsequent steps again.

On the other hand, as a result of the judgment in S1305, when j is not smaller than M', the identifiability evaluating section 131 stores the identifiability evaluation result information table 801 on the memory 203 in the storage 202 (S1311).

Details of the operation for evaluating the current node in S1308 are explained with reference to FIG. 15.

First, the identifiability evaluating section 131 initializes a loop variable "i" indicating a current record and a variable "df" indicating the number of records corresponding to a processing object node (S1501). Specifically, the identifiability evaluating section 131 sets "i" to 0 and "df" to 0. It is assumed that the current record is the variable "P" set in the processing in the immediately preceding step S1306. The identifiability evaluating section 131 judges whether i is smaller than N (S1502). As described above, "N" is the number of records of the index information table 126'.

As a result of the judgment in S1502, when i is smaller than N, the identifiability evaluating section 131 judges whether an appearing word as an evaluation object is included in an "i"-th record in the index information table 126' (S1503). For that purpose, the identifiability evaluating section 131 judges, for example, whether a "W"-th value of an ith record in the index information table 126', i.e., a value of "D☐" is greater than or equal to 1.

As a result of the judgment in S1503, when the appearing word as the evaluation object is included, the identifiability evaluating section 131 increments df to df+1 (S1504) and increments i to i+1 (S1505). Thereafter, the identifiability evaluating section 131 performs the processing in S1502 and the subsequent steps.

Figure 15:
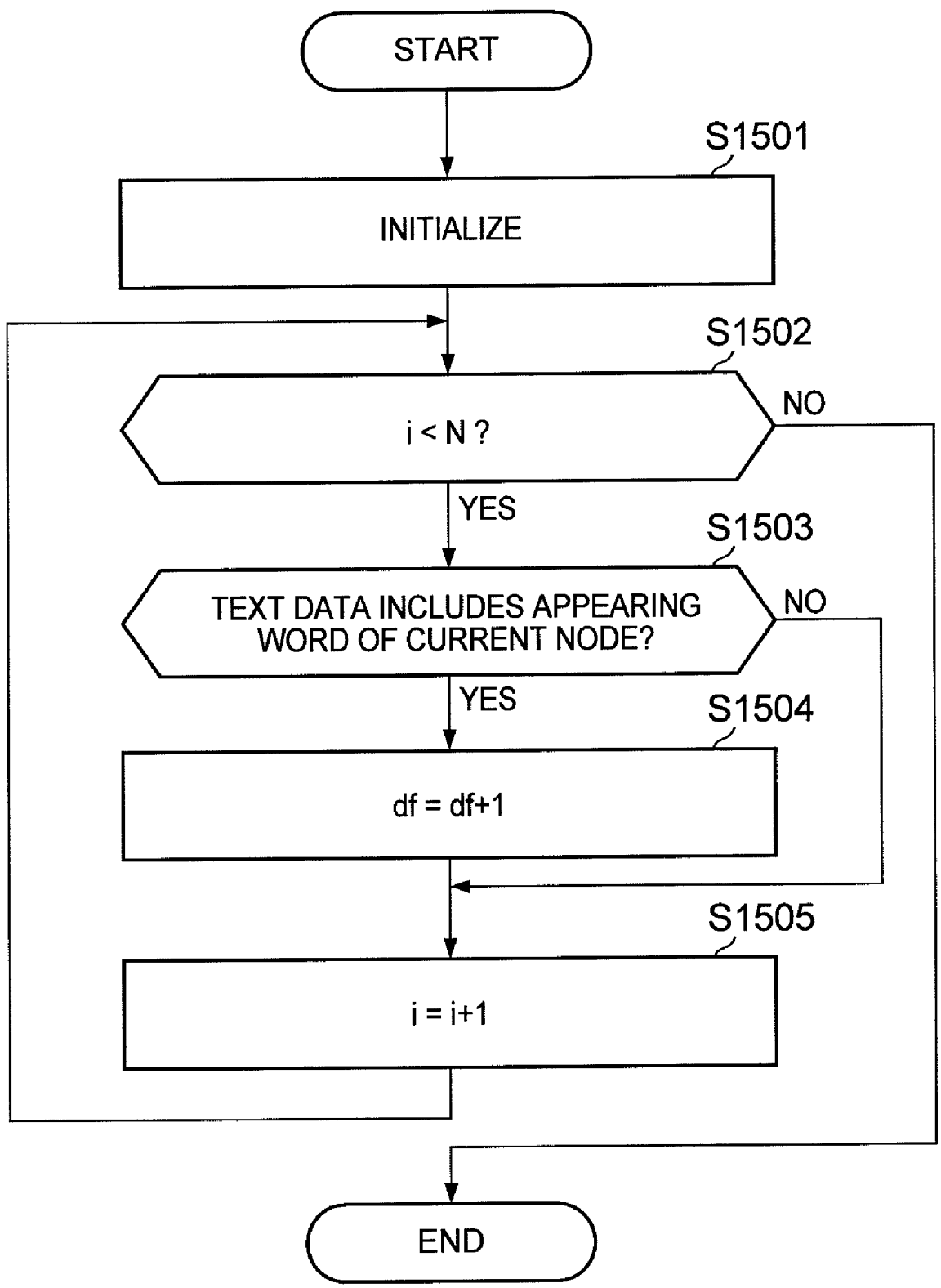
FIG. 15 is a flowchart for exemplifying an operation of the identifiability evaluating apparatus according to the first embodiment of the present invention.

On the other hand, as a result of the judgment in step S1502, when i is not smaller than N, the identifiability evaluating section 131 finishes the processing flow shown in FIG. 15 and performs the processing in S1309.

Details of an example of an operation for evaluating a node group having the depth which is greater than or equal to 2 in S1309 are explained with reference to FIG. 16. In an initial state when the identifiability evaluating section 131 starts the operation in S1309, a value of the variable "P" is a value of the current node at the time when the processing in the immediately preceding step S1308 is finished. A value of the variable "df" is a value at the time when the processing in the immediately preceding step S1308 is finished.

The identifiability evaluating section 131 initializes a stack variable "ST" representing an ancestor node set of a processing object node (S1601). The stack variable "ST" represents a queue generally referred to as first in last out (FILO) buffer. In this embodiment, each of elements of the stack variable "ST" is a value of the variable "P". Specifically, in the processing in S1601, the identifiability evaluating section 131 extracts all elements stored in the stack variable "ST" and empties a stack.

The identifiability evaluating section 131 judges whether "df" is greater than or equal to K (S1602). As described above, "K" is a value of the identifiability tolerance information 701 of the identifiability tolerance information 132.

As a result of the judgment in S1602, when df is greater than or equal to K, the identifiability evaluating section 131 temporarily saves candidates for an anonymization unnecessary word set (S1603). Specifically, the identifiability evaluating section 131 stores values of the stack variable "ST" and the variable "df" as values of a stack variable "ST'" and a variable "df'", respectively.

The identifiability evaluating section 131 judges whether a child node as a processing object is present (S1604). For that purpose, the identifiability evaluating section 131 judges whether P is smaller than (M'−1). As a result of this judgment, when P is smaller than (M'−1), the identifiability evaluating section 131 judges that a child node is present. When P is not smaller than (M'−1), the identifiability evaluating section 131 judges that a child node is not present.

As a result of the judgment in S1604, when a child node is not present, the identifiability evaluating section 131 performs processing in S1610 and subsequent steps described alter.

As a result of the judgment in S1604, when a child node is present, the identifiability evaluating section 131 adds a value of the variable "P" to the stack variable "ST".

The identifiability evaluating section 131 sets a child node of the present current node as a new current node (S1606). For that purpose, the identifiability evaluating section 131 increments P to P+1.

The identifiability evaluating section 131 sets a value of the variable "df" to 0 (S1607) and, subsequently, judges whether an appearing word corresponding to the current node set in the processing in the immediately preceding step S1606 has been processed (S1608). Since a specific example of this processing is the same as that in S1307, explanation of the example is omitted.

As a result of the judgment in S1608, when the appearing word corresponding to the current node has not been processed, the identifiability evaluating section 131 evaluates the current node (S1609) and performs the processing in S1602 and the subsequent steps again. Since an operation in S1609 is the same as that in S1501 to S1505, explanation of the operation is omitted. However, only the judgment on whether a record has an appearing word set corresponding to the current node in S1503 is different. As this judgment, when all the appearing words stored in the variable "P" and the stack variable "ST" are present, the identifiability evaluating section 131 judges that the record has the appearing word set corresponding to the current node. Specifically, assuming that a "k"-th element of the stack variable "ST" is "ST", when D☐ is greater than or equal to 1 and D☐☐ is greater than or equal to 1 for all "k"s, the identifiability evaluating section 131 judges that the record has the appearing word set corresponding to the current node. Note that "k" is an integer greater than or equal to 0 and smaller than the number of elements stored in the stack variable "ST".

After processing in S1609 is finished, the identifiability evaluating section 131 performs the processing in S1602 and the subsequent steps again.

On the other hand, when it is judged in S1602 that df is not greater than or equal to K or when it is judged in S1604 that a child node as a processing object is not present, the identifiability evaluating section 131 stores the values of the stack variable "ST'" and the variable "df'" temporarily saved in S1603 in the index information table 126 and the anonymization unnecessary word table 134 (S1610). For that purpose, for example, when the number of elements of the stack variable "ST'" is "x", the identifiability evaluating section 131 adds a new record in an "x"-th table among the identifiability evaluation result information tables 801 of the identifiability evaluation result information 133 and stores each of elements in the stack variable "ST'" and values of the variable "df'" as values of this record. The identifiability evaluating section 131 adds a new record in the anonymization unnecessary word table 134 in FIG. 9 and stores a value of an appearing word of each of elements of the variable "i" and the stack variable "ST'" as a value of each of the fields 501 and 502 of the added record. When a record, all fields of which take the same value, is already present in that table, the identifiability evaluating section 131 does not add a new record.

Specifically, for example, "{television, volume}" is stored in the stack variable "ST'" and "df'" is 100. In this case, the number of elements of the stack variable "ST'" is two. Therefore, the identifiability evaluating section 131 adds a record, in which a field 821 is "df'=100", a field 822 is "W=television", and a field 823 is "W=volume", to the second identifiability evaluation result information table 801.

The identifiability evaluating section 131 judges whether a sibling node of the current node as the processing object is present (S1611). Specifically, when P is smaller than (M'−1), the identifiability evaluating section 131 judges that a sibling node is present.

As a result of the judgment in S1611, when it is judged that a sibling node is present, the identifiability evaluating section 131 sets the sibling node as a current node (S1612). Specifically, the identifiability evaluating section 131 increments P to P+1.

The identifiability evaluating section 131 sets df to 0 (S1613). The identifiability evaluating section 131 judges whether an appearing word set corresponding to the current node has been processed (S1614). This processing is the same as the processing in S1307.

The identifiability evaluating section 131 evaluates the current node (S1615). This processing is the same as the processing in S1609.

After processing in S1615 is finished, the identifiability evaluating section 131 performs the processing in S1601 and the subsequent steps again.

On the other hand, as a result of the judgment in S1611, when it is judged that a sibling node is not present, the identifiability evaluating section 131 judges whether a descendant node is being evaluated (S1616). Specifically, when the number of elements stored in ST is greater than or equal to 1, the identifiability evaluating section 131 judges that a descendant node is being evaluated. When the number of elements stored in ST is 0, the identifiability evaluating section 131 judges that a descendant node is not being evaluated.

As a result of the judgment in S1616, when it is judged that a descendant node is not being evaluated, in order to track back the search tree, the identifiability evaluating section 131 sets a parent node as a current node (S1617). Specifically, the identifiability evaluating section 131 extracts an element added to the variable "ST" last and sets the element to the variable "P".

After processing in S1617 is finished, the identifiability evaluating section 131 performs the processing in S1611 and the subsequent steps again.

Figure 16:
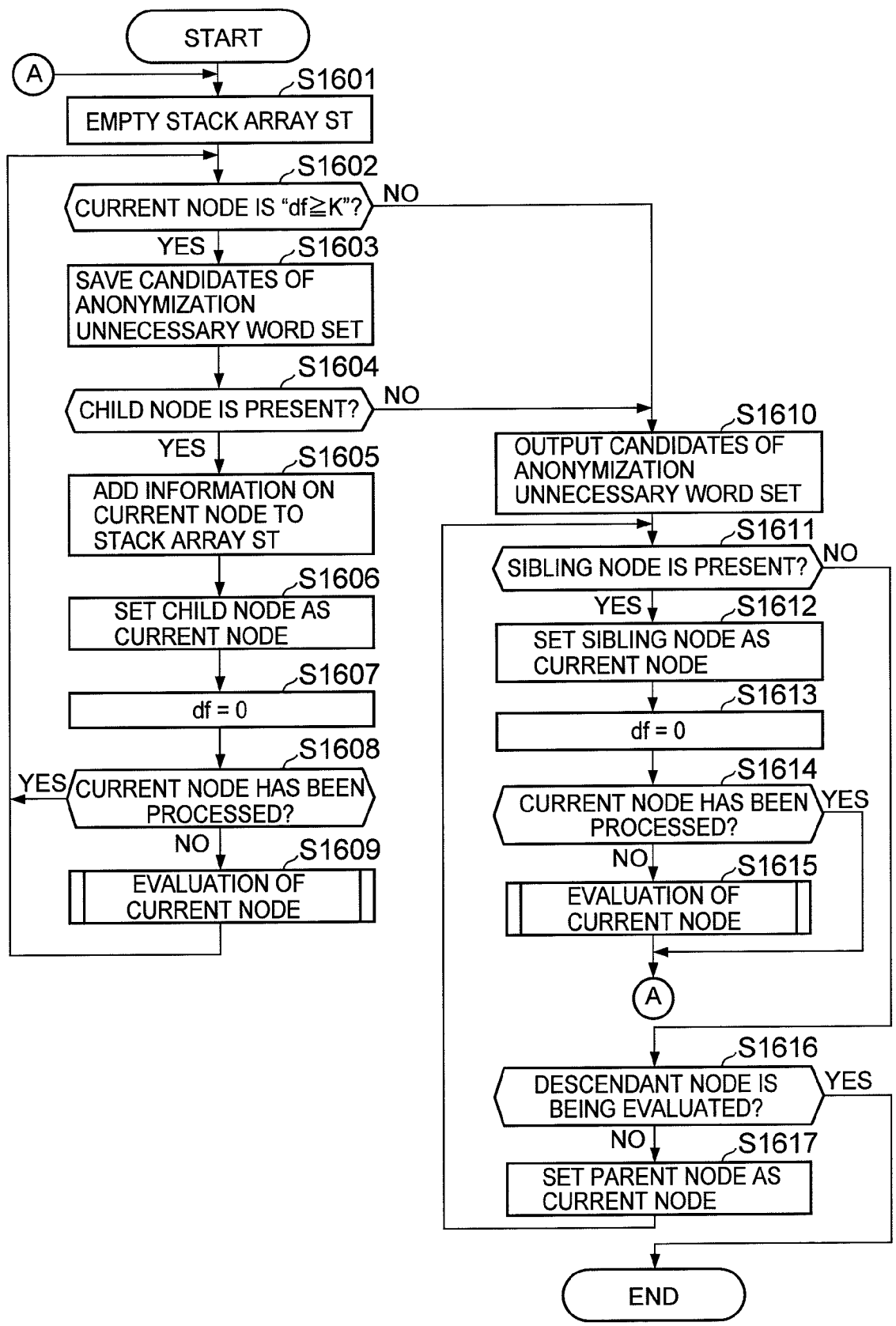
FIG. 16 is a flowchart for exemplifying an operation of the identifiability evaluating apparatus according to the first embodiment of the present invention.

On the other hand, as a result of the judgment in S1616, when it is judged that a descendant node is being evaluated, the identifiability evaluating section 131 finishes the processing shown in FIG. 16.

Details of the operation in S1105 in FIG. 11 have been described above.

As described above, this embodiment is characterized in that, instead of extracting an appearing word which should be concealed, an appearing word set with a low identification probability is comprehensively checked and an appearing word which can be disclosed is extracted. When only an appearing word set having an identification probability equal to or higher than a threshold is disclosed and an appearing word set having an identification probability lower than the threshold is not disclosed, an identification probability equal to or lower than "1/K" can be guaranteed for all text data of the text data table 111. In this embodiment, making use of a characteristic that, as appearing words to be combined increase, the number of text data including the appearing words monotonously decreases, an appearing word set unnecessary to be evaluated is judged in the processing in S1602. In the processing, it is judged whether an identification probability increases to be equal to or higher than the threshold every time the number of appearing words to be combined is increased by one. At a point when it is judged that the identification probability does not increase to be equal to or higher than the threshold, i.e., that an appearing word set is a dangerous set highly likely to be identified, an increase in the number of appearing words to be further combined with the appearing word set and the evaluation of appearing words are stopped. In this embodiment, it is judged whether an appearing word of a current node has been evaluated. As a result of the judgment, when the appearing word has been evaluated, evaluation of a node deeper than the current node is not performed. This processing makes use of the characteristic of an anonymization unnecessary word set and the structure of the search tree. For example, the processing makes use of a characteristic that, when there are two anonymization unnecessary word sets "α" and "β" and "α" has all appearing words of "β", if "α" is an anonymization unnecessary word set, "β" is also an anonymization unnecessary word set. The processing also makes use of a characteristic that, according to the evaluation rules (1) and (2) of the search tree, a node corresponding to "α" among the appearing word sets "α" and "β" is evaluated earlier. According to these characteristics, the identifiability evaluating apparatus 103 in this embodiment can perform the evaluation processing with efficiency. Moreover, the identifiability evaluating apparatus 103 in this embodiment can reduce evaluation time.

Details of the operation in S1109 for anonymizing text data are explained with reference to FIG. 17.

As described above, the text-data anonymizing apparatus 104 performs the processing in S1106, S1107, and S1108.

According to the processing, the anonymizing section 141 of the text-data anonymizing apparatus 104 acquires the identifiability evaluation result information 133, i.e., the identifiability evaluation result information table 801 from the storage 202 of the identifiability evaluating apparatus 103 and stores the same in the memory 203 of the text-data anonymizing apparatus 104. The anonymizing section 141 of the text-data anonymizing apparatus 104 acquires the index information table 126 and the linked data management table 125 from the storage 202 of the text-data analyzing apparatus 102 and stores the same in the memory 203 of the text-data anonymizing apparatus 104. The anonymizing section 141 of the text-data anonymizing apparatus 104 acquires one piece of text data as an anonymization object in the text data table 111 from the storage 202 of the text-data analyzing apparatus 102 and stores the text data in the memory 203 of the text-data anonymizing apparatus 104. As described above, values of the field 301, the field 302, the field 303, the field 304, the field 305, and the like are included in this text data. In the following explanation, when the linked data management table 125, the index information table 126, and the identifiability evaluation result information table 801 in the storage 202 of each of the text-data analyzing apparatus 102 and the identifiability evaluating apparatus 103 are specifically distinguished from the linked data management table 125, the index information table 126, and the identifiability evaluation result information table 801 stored in the memory 203 of the text-data anonymizing apparatus 104, these tables are referred to as liked data management table 125', index information table 126', and identifiability evaluation result information table 801'.

Figure 17:
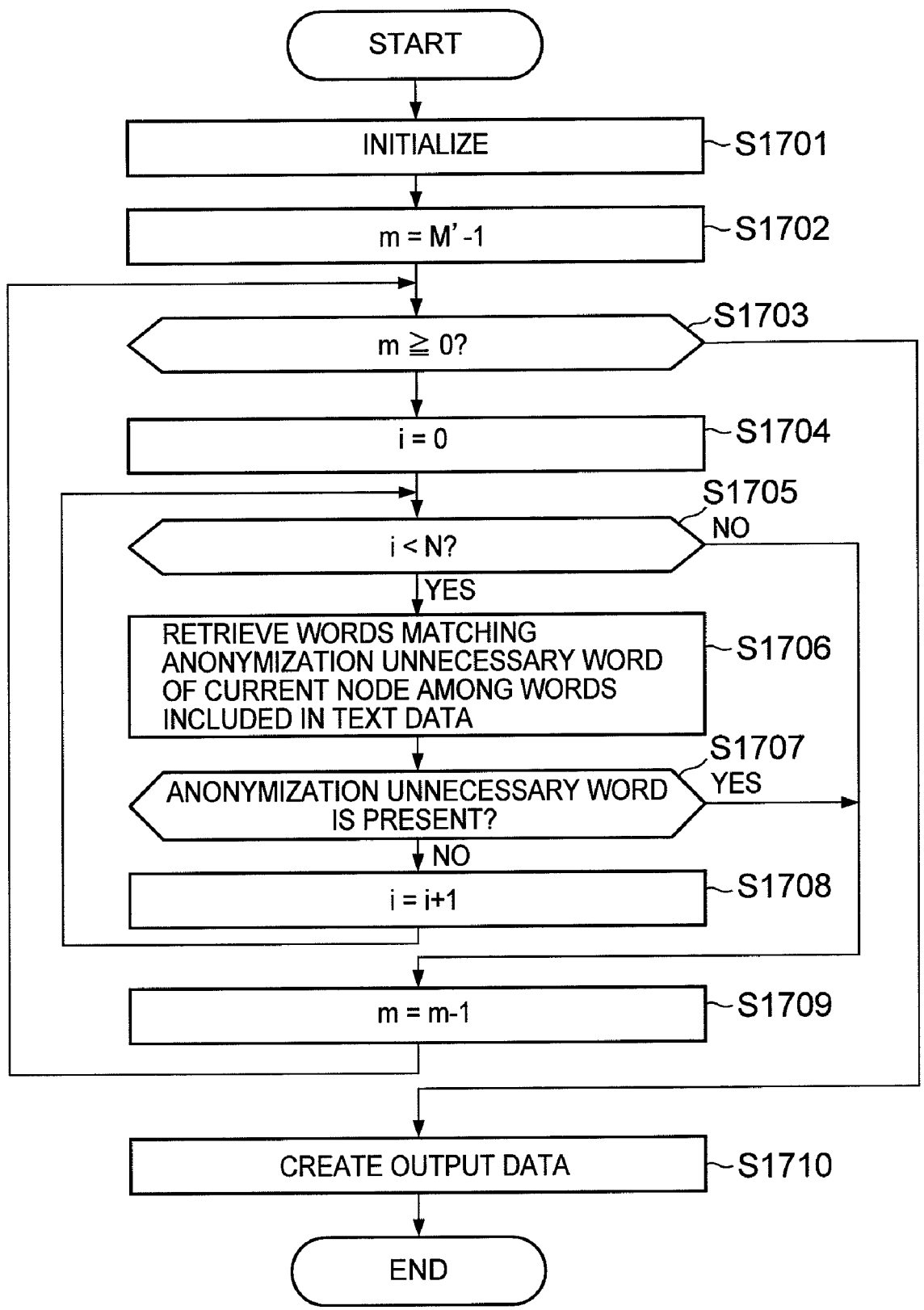
FIG. 17 is a flowchart for exemplifying an operation of a text data anonymizing apparatus according to the first embodiment of the present invention.

In FIG. 17, first, the anonymizing section 141 initializes a variable "DN", an array "W", and an array "A" (S1701). For that purpose, first, the anonymizing section 141 selects a record, in which a value of the field 502 matches with a text number of the field 301 of text data copied in the memory 203, among records of the linked data management table 125'. The anonymizing section 141 refers to a value of the field 501 of the selected record. Consequently, the anonymizing section 141 specifies an identifier (a data linkage number) of linked data of anonymization object text data. The anonymizing section 141 sets the acquired data linkage number as a value of the variable "DN". Specifically, for example, when text data with a text number "1" and the linked data management table 125', an example of which is shown in FIG. 7, are stored in the memory 203 of the text-data anonymizing apparatus 104, the anonymizing section 141 acquires an identifier "0" of the linked data and sets D to 0.

The anonymizing section 141 stores an element in the array "W". The anonymizing section 141 stores the number of appearing words stored in the array "W" in the variable "M'". This processing is the same as the processing in S1302.

In the following explanation, an element of a "DN"-th record of the index information table 126' is indicated as "IN[j]". "j" is an integer greater than or equal to 0 and equal to or smaller than M'.

In order to store an anonymization unnecessary word in the following processing, the anonymizing section 141 initializes the array "A" having a size M'. For that purpose, when a value of "IN[j]" of each of j=0, 1 . . . , M' is smaller than 0, the anonymizing section 141 sets a value of an array "A" to 0. When the value is 0, the anonymizing section 141 sets a value of the array "A" to −1.

Following S1701, the anonymizing section 141 sets a loop variable "m" to M'−1 (S1702).

The anonymizing section 141 judges whether m is greater than or equal to 0 (S1703).

As a result of the judgment in S1703, when m is not greater than or equal to 0, the anonymizing section 141 executes processing in S1710 described later.

On the other hand, as a result of the judgment in S1703, when m is greater than or equal to 0, the anonymizing section 141 sets the loop variable "i" to 0 (S1704).

The anonymizing section 141 judges whether i is smaller than N (S1705). "N" is the number of records of a table of SW among one or more identifiability evaluation result information tables 801'.

As a result of the judgment in S1705, when it is judged that is not smaller than N, the anonymizing section 141 performs processing in S1709 described later.

On the other hand, as a result of the judgment in S1705, when it is judged that i is smaller than N, the anonymizing section 141 judges whether an appearing word matching an anonymization unnecessary word included in an anonymization unnecessary word set included in an "i"-th record of SW is included in appearing words included in the text data in the memory 203. When an appearing word matching the anonymization unnecessary word is included, the anonymizing section 141 stores the matching appearing word as an element of the array "A" (S1706). For that purpose, the anonymizing section 141 sets A to 1 for all "j"s for which {anonymization unnecessary word set of the ith record of SW} {W|A=0} holds. "j" is an integer greater than or equal to 0 and equal to or smaller than (M'−1).

The anonymizing section 141 judges whether an appearing word matching the anonymization unnecessary word included in the anonymization unnecessary word set included in the "i"-th record of SW is included in the appearing words included in the text data in the memory 203 in the processing in S1706 (S1707).

As a result of the judgment in S1707, when an appearing word matching the anonymization unnecessary word is not included, the anonymizing section 141 increments i to i+1 (S1708) and performs the processing in S1705 and the subsequent steps again.

On the other hand, when it is judged in the judgment in S1705 that i is not smaller than N or when it is judged in the judgment in S1707 that an appearing word matching the anonymization unnecessary word is not included, the anonymizing section 141 decrements m to m−1 (S1709) and performs the processing in S1703 and the subsequent steps again.

On the other hand, when it is judged in S1703 that m is not greater than or equal to 0, the anonymizing section 141 generates output data (S1710). Specifically, the anonymizing section 141 retrieves an appearing word represented by W for all "j"s for which "A=0" holds from the text data in the memory 203 and replaces the retrieved appearing word with an anonym word. A technique for acquiring an anonym word is not specifically limited. However, in this explanation, it is assumed that the anonymizing section 141 gives an anonym word by coupling, for example, a character string such as "A" and "B" and a character string representing a numerical value of W. Specifically, for example, when the appearing word "foo@a.com" in the text data is indicated by a number "0" and "W=0", the anonymizing section 141 replaces "foo@a.com" with "A0".

Details of the operation in S1109 have been explained. As described above, the output data generated in S1710 is stored in each of the records of the anonymized text data table 142 in the storage 202 of the text-data anonymizing apparatus 104 in S1110.

After the anonymized text data table 142 is stored as described above, for example, when the administrator makes an instruction to output the anonymized text data table 142 using the input device 206 of the text-data anonymizing apparatus 104 or an input device of a not-shown information terminal, the anonymized text data table 142 may be outputted. An example in displaying the anonymized text data table 142 on the display device is explained with reference to FIG. 18. In FIG. 18, a screen 1801 is an example in displaying each of the records in the anonymized text data table 142, an example of which is shown in FIG. 10.

The first embodiment has been explained. A characteristic of the system described above is to comprehensively check a set of words with a large appearance frequency and extract an appearance word set for which anonymization is unnecessary. A set of words with high identifiability, for which anonymization is not regarded as unnecessary, is converted into a meaningless anonym word. As a result, even if a universal set of text data is searched through with any word not converted into an anonym word, "K" or more pieces of text data are always hit. Consequently, it is possible to anonymize the text data while converting only words having high identifiability from the text data into anonym words and keeping the other words in original forms.

The system judges whether an appearance frequency increases to be equal to or higher than the threshold every time the number of appearing words to be combined is increased by one and, at a point when the appearance frequency does not increase to be equal to or higher than the threshold, stops increasing the number of appearing words and evaluating the appearing words. In the system, unnecessary evaluation processing for appearing words already found as elements of an anonymization unnecessary word set is not performed. Consequently, the system can efficiently execute processing.

Second Embodiment

A second embodiment of the present invention will be explained. In the first embodiment, anonymized text data for which identifiability is guaranteed is outputted. In the second embodiment explained below, it is possible to change a method of allocating anonym words in text data anonymization processing. In the second embodiment, it is possible to entrust an external corporation or the like with analysis while keeping a part of text data as anonym words. This analysis may be arbitrary and is not specifically limited. However, in an example explained below, a degree of importance is acquired from an appearance frequency of a word in text data.

For simplification of explanation, in the second embodiment explained below, components same as those in the first embodiment are denoted by the same reference symbols and explanation of the components is omitted.

An example of a system configuration according to the second embodiment is explained with reference to FIG. 19.

Figure 19:
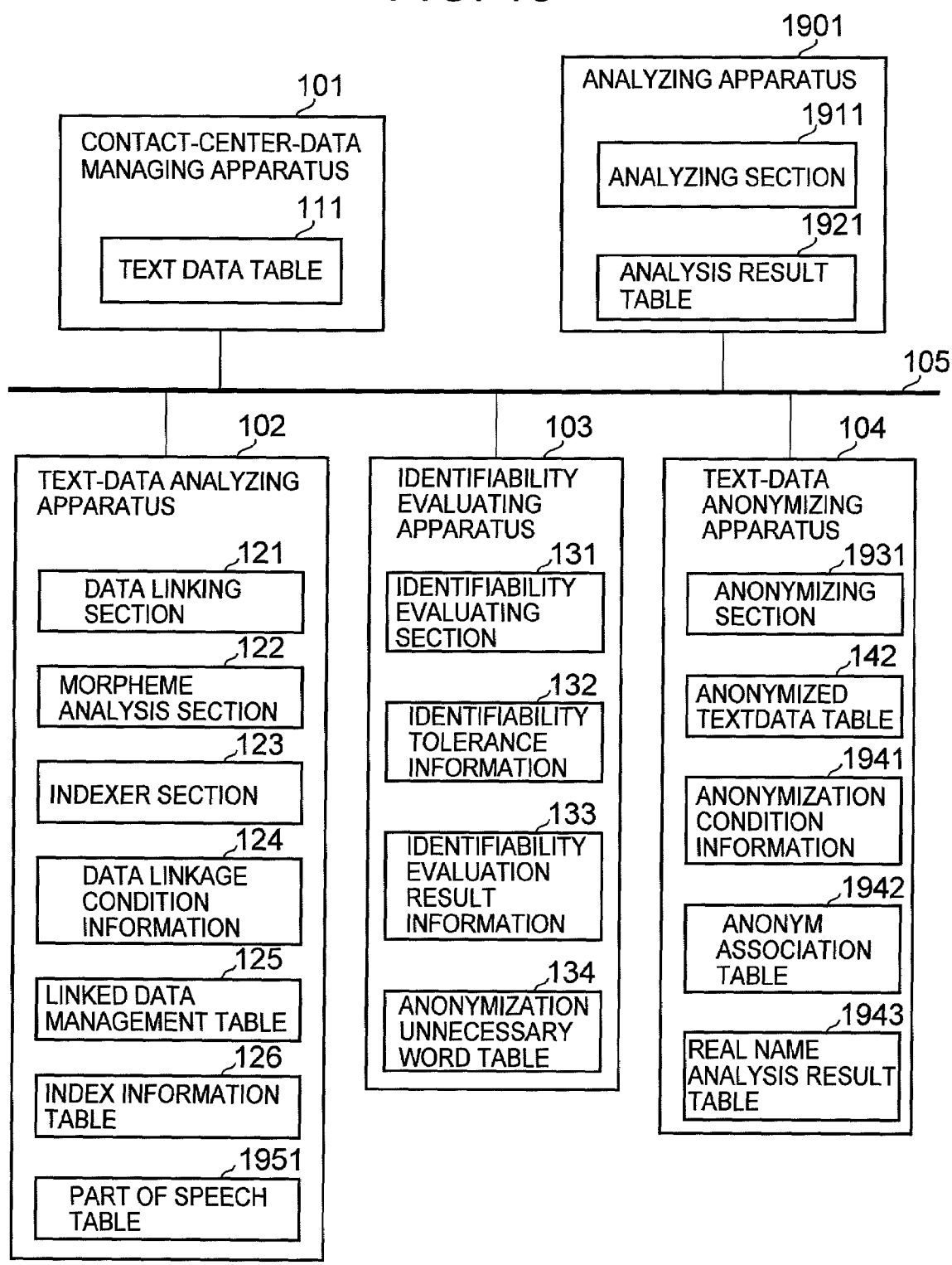
FIG. 19 is a diagram exemplifying a system configuration according to a second embodiment of the present invention.

In FIG. 19, the system configuration according to the second embodiment is different from that according to the first embodiment in that an analyzing apparatus 1901 is further coupled to the communication network 105. The analyzing apparatus 1901 is an arbitrary information processing apparatus such as a PC, a server, or a workstation. The analyzing apparatus 1901 is managed by, for example, an external corporation. Analysis of anonymized text data is performed by the analyzing apparatus 1901. A hardware configuration of the analyzing apparatus 1901 is the same as that shown in FIG. 2. The hardware configuration includes the CPU 201, the storage 202, the memory 203, the input device 204, the output device 205, and the communication device 206.

The CPU 201 of the analyzing apparatus 1901 realizes an analyzing section 1911 by loading a program (not shown) to the memory 203 and executing the program. An analysis result table 1921 is stored in the storage 202 of the analyzing apparatus 1901. The analyzing section 1911 acquires a degree of importance from an appearance frequency of a word and stores a result of the acquisition in the analysis result table 1921.

In the second embodiment, the CPU 201 of the text-data anonymizing apparatus 104 realizes an anonymizing section 1931 by executing a program (not shown) loaded to the memory 203. Anonymization condition information 1941, an anonym association table 1942, and a real name analysis result table 1943 are further stored in the storage 202 of the text-data anonymizing apparatus 104. The anonymizing section 1931 has a function same as that of the anonymizing section 141. The anonymizing section 1931 decides conditions for anonymization in accordance with information in the anonymization condition information 1941 and stores anonym words, parts of speech, and the like, created in accordance with the conditions in the anonym association table 1942. The anonymizing section 1931 acquires the analysis result table 1921 from the analyzing apparatus 1901 and creates the real name analysis result table 1943 in accordance with the acquired analysis result table 1921.

A part of speech table 1951 is further stored in the storage 202 of the text-data analyzing apparatus 102. In the part of speech table 1951, a part of speech for each of morphemes acquired by the morpheme analysis of the morpheme analysis section 122 is stored.

An example of the information described above is explained.

First, examples of the anonymization condition information 1941 are explained with reference to FIGS. 20A and 20B. In the explanation of this embodiment, it is assumed that the anonymization condition information 1941 has a plurality of tables and pieces of information in these tables are combined to set conditions for anonymization. The tables are hereinafter explained as "anonymization condition information tables 2001". When a plurality of anonymization condition information tables 2001 are specifically distinguished and explained, a symbol is affixed to the reference numeral, for example, "anonymization condition information table 2001*a*". In the example explained below, the anonymization condition information 1941 has two anonymization condition information tables 2001.

In FIG. 20A, each of records in the anonymization condition information table 2001*a* has a field 2011, a field 2012, and the like. A value of the field 2011 indicates a category of an appearing word. The field 2012 is a part of speech of a value of the field 2011 of the same record. In the case of FIG. 20A, for example, a part of speech of the field 2011 "person's name" is indicated by the field 2012 "noun" of the same record. The field 2011 "all" indicates that a category of an appearing word is not specified.

In FIG. 20B, each of records in the anonymization condition information table 2001*b* has a field 2021. A value of the field 2021 indicates an option of anonymization for the category set in the anonymization condition information table 2001*a*. In the case of FIG. 20B, "common in all texts" and "common in each text" are included as options of anonymization. "Common in all texts" means that, when the same anonymization object appearing word is included in a plurality of pieces of text data, the anonymization object appearing word is replaced with the same anonym word. "Common in each text" means that, when the same anonymization object appearing word is included in a plurality of pieces of text data, the anonymization object appearing word is replaced with a different anonym word for each piece of the text data.

For example, a person's name "Sato" appears in text data A twice and appears in text data B twice. In the case of this text data, "person's name" in the field 2011 of the anonymization condition information table 2001*a* is selected and "common in all texts" in the field 2021 of the anonymization condition information table 2001*a* is selected. Then, "Sato" included in the text data A and "Sato" included in the text data B are replaced with the same anonym word "A2". This is a setting performed, for example, when it is necessary to clearly indicate in analysis of text data that the same person is involved in a plurality of texts. On the other hand, in the case of the text data described above, "person's name" in the field 2011 of the anonymization condition information table 2001*a* is selected and "common in each text" in the field 2021 of the anonymization condition information table 2001*a* is selected. Then, "Sato" included in the text data A is replaced with an anonym word "A2" and "Sato" included in the text data B is replaced with an anonym word "B1". This is a setting performed when, for example, it is desired to make it difficult to surmise that the same person is involved in a plurality of text data.

It is assumed that the anonymization condition information 1941 is stored in the storage 202 of the text-data anonymizing apparatus 104 in advance. Details of the setting performed by using the anonymization condition information 1941 are described later.

An example of the anonym association table 1942 is explained with reference to FIG. 21.

In FIG. 21, each of records in the anonym association table 1942 has a field 2101, a field 2102, a field 2103, and the like. The field 2101 is an anonymization object appearing word (real name word). The field 2102 is an appearing word (anonym word) after anonymization. The field 2103 is a part of speech of appearing words in the field 2101 and the field 2102 of the same record.

Examples of the analysis result table 1921 and the real name analysis result table 1943 are explained with reference to FIGS. 22A and 22B.

As described above, the analysis result table 1921 is an analysis result obtained by analyzing text data after anonymization. The real name analysis result table 1943 is a table created by converting anonym words included in the analysis result table 1921 into real name words. The analysis result table 1921 and the real name analysis result table 1943 are different only in that at least some of appearing words are anonym words or real name words. Otherwise, the tables indicate identical information.

An example of the analysis result table 1921 is shown in FIG. 22A. In FIG. 22A, each of records in the analysis result table 1921 has a field 2201, a field 2202, and the like. The field 2201 is a degree of importance. The field 2202 is an appearing word having the degree of importance in the field 2201 of the same record.

An example of the real name analysis result table 1943 is shown in FIG. 22B. In FIG. 22B, each of records in the real name analysis result table 1943 has a field 2211, a field 2212, and the like. The field 2211 is a degree of importance. The field 2212 is an appearing word having the degree of importance in the field 2211 of the same record.

The analysis result table 1921 and the real name analysis result table 1943, examples of which are shown in FIGS. 22A and 22B, respectively, are compared. Whereas a value of the field 2202 of a record corresponding to the field 2201 "3" of the analysis result table 1921 is "A2", a value of the field 2212 of a record corresponding to the field 2211 "3" of the real name analysis result table 1943 is "Sato". This indicates that the real name word "Sato" is replaced with the anonym word "A2".

Details of an operation for creating these tables are described later.

An example of the part of speech table 1951 is explained with reference to FIG. 23.

In FIG. 23, each of records in the part of speech table 1951 has a field 2301, a field 2302, and the like. The field 2301 is a morpheme. The field 2302 is a part of speech of a morpheme in the field 2301 of the same record.

An example of a sequence according to the second embodiment is explained with reference to FIG. 24. In the following explanation, processing same as that in the first embodiment is briefly explained below.

Figure 24:
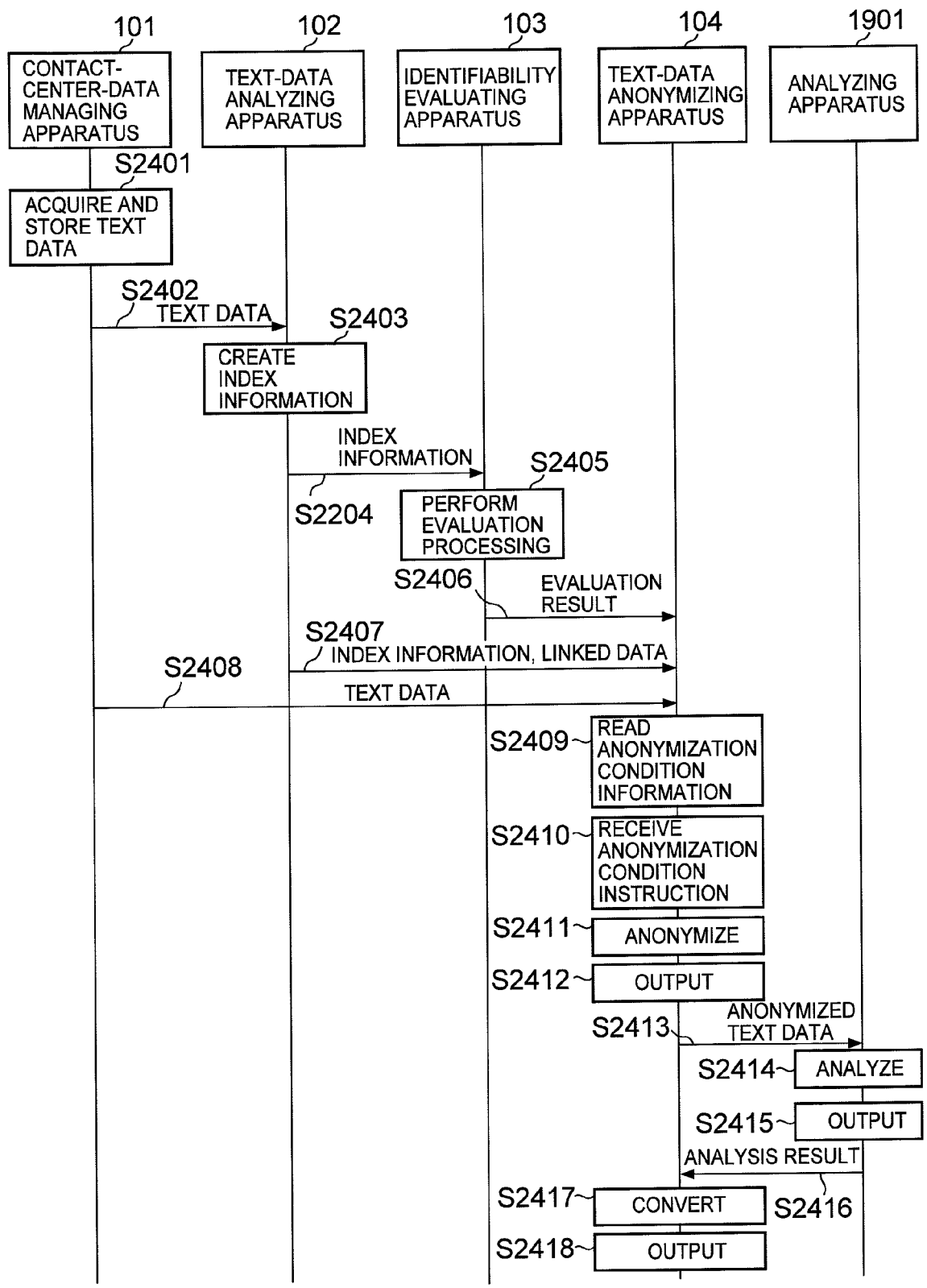
FIG. 24 is a diagram exemplifying a sequence according to the second embodiment of the present invention.

In FIG. 24, a processing unit z1011 of the contact-center-data managing apparatus 101 collects text data and stores the text data in the text data table 111 (S2401). This processing is the same as that in S1101 described above.

The data linking section 121 of the text-data analyzing apparatus 102 reads text data in the text data table 111 and copies the text data in the storage 202 of the text-data analyzing apparatus 102 (S2402). This processing is the same as that in S1102. The data linking section 121 of the text-data analyzing apparatus 102 performs data linkage processing to create the linked data management table 125. The morpheme analysis section 122 applies morpheme analysis to linked data to create the part of speech table 1951. For that purpose, the morpheme analysis section 122 acquires a part of speech of each of morphemes from each piece of text data by using the prior art and stores the acquired morpheme and the part of speech as values of the field 2301 and the field 2302 of each of records, respectively, in the part of speech table 1951. The indexer section 123 performs index establishment processing to create the index information table 126 (S2403). This processing is the same as that in S1103.

The identifiability evaluating section 131 of the identifiability evaluating apparatus 103 reads the index information table 126 from the text-data analyzing apparatus 102 and copies and stores the index information table 126 in the memory 203 of the identifiability evaluating apparatus 103 (S2404). This processing is the same as that in S1104. The identifiability evaluating section 131 searches for, referring to the index information table 126', a combination which an appearing word can take and evaluates identifiability (S2405). This processing is the same as that in S1105.

The anonymizing section 1931 of the text-data anonymizing apparatus 104 reads the identifiability evaluation result information table 801 of the identifiability evaluation result information 133 in the storage 202 of the identifiability evaluating apparatus 103 and stores the identifiability evaluation result information table 801 in the memory 203 (S2406). The anonymizing section 1931 reads the index information table 126, the linked data management table 125, and the part of speech table 1951 stored in the storage 202 of the text-data analyzing apparatus 102 and copies the tables in the memory 203 (S2407). The anonymizing section 1931 reads text data from the text data table 111 stored in the contact-center-data managing apparatus 101 and stores the text data in the memory 203 (S2408). These kinds of processing are the same as those in S1106 to S1108 except that the part of speech table 1951 is outputted to the storage 202.

The anonymizing section 1931 of the text-data anonymizing apparatus 104 loads the anonymization condition information 1941 read from the storage 202 to the memory 203 of the text-data anonymizing apparatus 104 (S2409).

The anonymizing section 1931 receives designation of anonymization conditions (S2410). For that purpose, the anonymizing section 1931 displays a screen, an example of which is shown in FIG. 25, on a display or the like of the output device 205 of the text-data anonymizing apparatus 104.

In FIG. 25, a screen 2501 is a screen for receiving designation of anonymization conditions. The screen 2501 has an area 2511, an area 2522, an area 2523, and an area 2524, and the like.

Text data is displayed in the area 2511. The text data is stored in the memory 203 of the text-data anonymizing apparatus 104.

The area 2522 is an area for selecting one of categories in the anonymization condition information table 2001a of the anonymization condition information 1941 using pull-down or the like. The category displayed in the area 2522 is a value of the field 2011 of each of records in the anonymization condition information table 2001a.

The area 2523 is an area for selecting detailed information of the category designated in the area 2522. The detailed information displayed in the area 2523 is information indicating at least a part or all of appearing words included in each of fields of a first record of the index information table 126'. The appearing words displayed in the area 2523 are appearing words of a part of speech belonging to the category selected in the area 2522. For that purpose, when any one of categories is selected in the area 2522, the anonymizing section 1931 retrieves, with reference to each of the fields 2011 of the anonymization condition information table 2001a, a record including a category matching the category selected in the area 2522 and extracts a value of the field 2012 of the retrieved record. The anonymizing section 1931 retrieves, with reference to each of the fields 2302 of the part of speech table 1951, a record including a value matching the extracted value of the field 2012 and extracts a value of the field 2301 of the retrieved record. The anonymizing section 1931 outputs the extracted value of the field 2301 and the information indicating all the appearing words as detailed information of the area 2523.

The area 2524 is an area for selecting one of options in the anonymization condition information table 2001b of the anonymization condition information 1941 using pull-down or the like. The option displayed in the area 2524 is a value of the field 2021 of each of records in the anonymization condition information table 2001b.

An administrator designates conditions in each of the areas 2522, 2523, and 2524, for example, using the input device 204 or the like of the text-data anonymizing apparatus 104. On the screen 2501, for example, "person's name" is selected in the area 2522, "Sato" is selected in the area 2523, and "common in each text" is selected in the area 2524. This indicates that each of appearing words "Sato" included in text data displayed in the area 2511 of the screen 2501 is replaced with the same anonym word. On the screen 2501, for example, "all" is selected in the area 2522, "-(NULL)" is selected in the area 2523, and "common in each text" is selected in the area 2524. This indicates that each of all appearing words other than anonymization unnecessary words among appearing words included in the text data displayed in the area 2511 of the screen 2501 is replaced with the same anonym word. The anonymizing section 1931, for example, stores a category selected in the area 2512, content selected in the area 2513, an option selected in the area 2514, and the like in the memory 203 and uses the same in anonymization processing described later.

In FIG. 24, the anonymizing section 1931 anonymizes, with reference to each of anonymization unnecessary sets stored in each of the identifiability evaluation result information tables 801', an appearing word not corresponding to the anonymization unnecessary word set among the appearing words included in the text data stored in the memory 203 in the processing in S2408 (S2411). This processing is the same as that in S1109 except that it is judged in accordance with the conditions received in the processing in S2410 whether an appearing word should be anonymized and rules for setting an anonym word for replacing the appearing word, a real name word, and an anonym word are stored in the anonym association table 1942. The anonymizing section 1931 judges, with reference to the category, the detailed information, the option, and the like set in the screen 2501 in the memory 203, whether an appearing word should be anonymized. Specifically, for example, when the category "person's name", the detailed information "Sato", and the option "common in each text" are stored in the memory 203, the anonymizing section 1931 performs processing same as that in S1109 and replaces the anonymization object appearing word "Sato" included in the text data with an anonym word different for each piece of text data. For example, when the category "all", the detailed information "–", and the option "common in each text" are stored, the anonymizing section 1931 performs processing same as that in S1109 and replaces each of anonymization object appearing words included in the text data with an anonym word different for each piece of text data.

The anonymizing section 1931 performs setting of an anonym word for replacing an appearing word according to the setting received in the processing in S2410. Specifically, for example, when the option "common in each text" is selected, as a setting rule for an anonym word, the anonymizing section 1931 makes prefixes of the anonym words different for each piece of text data. The anonymizing section 1931 gives a serial number or the like to each of the prefixes to create an anonym word. When the option "common in all texts" is selected, the anonymizing section 1931 creates, with reference to the categories, the detailed information, and the like in the memory 203, anonym words different for each of appearing words specified by the categories, the detailed information, and the like and replaces the same appearing word included in each piece of different text data with the same anonym word.

The anonymizing section 1931 stores a real name word, an anonym word, and a part of speech for each of appearing words in the field 2101, the field 2102, and the field 2103 of each of the records of the anonym association table 1942, respectively. It is advisable to acquire the part of speech of the anonymization object appearing word from the part of speech table 1951. The anonymizing section 1931 retrieves, with reference to each of the fields 2301 of the part of speech table 1951, an appearing word matching the anonymization object appearing word and sets a value of the field 2302 of a record including the retrieved field 2301 as a part of speech of the appearing word.

As a specific example, the category "person's name", the detailed information "Sato", and the option "common in each text" are stored in the memory 203 and the anonymization object appearing word "Sato" is included in each of the text data A and the text data B. In this case, the anonymizing section 1931 creates a prefix "A" of the text data A and a prefix "B" of the text data B. The anonymizing section 1931 replaces "Sato" included in the text data A with "A2". The anonymizing section 1931 replaces "Sato" included in the text data B with "B2". The anonymizing section 1931 extracts the field 2302 "noun" included in a record whose value in the field 2301 is "Sato" from the part of speech table 1951. The anonymizing section 1931 adds a new record to the anonym association table 1942 and stores "Sato", "A2", "noun", and the like as the field 2101, the field 2102, the field 2103, and the like of the added record. The anonymizing section 1931 stores "Sato", "B2", "noun", and the like as the field 2101, the field 2102, the field 2103, and the like of the added new record.

As another specific example, the category "person's name", the detailed information "Sato", and the option "common in all texts" are stored in the memory 203 and the anonymization object appearing word "Sato" is included in each of the text data A and the text data B. In this case, the anonymizing section 1931 creates an anonym word "AA" for the anonymization object appearing word "Sato". The anonymizing section 1931 replaces "Sato" included in the text data A with "AA". The anonymizing section 1931 replaces "Sato" included in the text data B with "AA". The anonymizing section 1931 extracts the field 2302 "noun" included in a record whose value in the field 2301 is "Sato" from the part of speech table 1951. The anonymizing section 1931 adds a new record to the anonym association table 1942 and stores "Sato", "AA", "noun", and the like as the field 2101, the field 2102, the field 2103, and the like of the added record.

After the processing in S2411, the anonymizing section 1931 of the text-data anonymizing apparatus 104 outputs a result of the processing in S2410 to the anonymized text data table 142 on the storage 202 (S2412). This processing is the same as that in S1110.

Examples of the anonymized text data table 142 according to the second embodiment are explained with reference to FIGS. 26A and 26B. In FIG. 26A, the anonymized text data table 142 is an example in which the category "person's name", the detailed information "Sato", and the option "common in each text" are set. In FIG. 26B, the anonymized text data table 142 is an example in which the category "person's name", the detailed information "Sato", and the option "common in all texts" are set.

Referring back to FIG. 24, after the processing in S2411 is finished, the analyzing apparatus 1901 starts processing in S2413 described later. Timing for starting the processing in S2413 and subsequent steps may be arbitrary timing after S2412 described above. For example, the processing is started when the administrator makes an instruction for execution using the input device 203 of the analyzing apparatus 1901, when the anonymized text data table 142 of the text-data anonymizing apparatus 104 is updated, at every predetermined time, and the like.

First, the analyzing section 1911 of the analyzing apparatus 1901 acquires the anonymized text data table 142 and the anonym association table 1942 from the text-data anonymizing apparatus 104 (S2413). However, concerning the anonym association table 1942, only the field 2102 and the field 2103 of each of the records are acquired. A technique for realizing this may be arbitrary. For example, the administrator or the like of the text-data anonymizing apparatus 104 may apply access control to the analyzing apparatus 1901 in advance to prevent the analyzing apparatus 1901 from referring to a value of the field 2101 of each of the records in the anonym association table 1942. Alternatively, the anonymizing section 1931 of the text-data anonymizing apparatus 104 may copy a table created by excluding the field 2101 from the anonym association table 1942 and, when a data request from the analyzing apparatus 1901 is received, transmit this copied table to the analyzing apparatus 1901.

The analyzing section 1911 executes analysis processing using the anonymized text data table 142 and the anonym association table 1942 read in S2413 (S2414). As described above, this analysis processing may be arbitrary. It is assumed here that a degree of importance of each of words is acquired from an appearance frequency of the word in text data. The analyzing section 1911 stores the acquired degree of importance and the word having the degree of importance as the field 2201 and the field 2202 of the analysis result table 1921 in the memory 203.

The analyzing section 1911 outputs an analysis result to the storage 202 of the analyzing apparatus 1901 as the analysis result table 1921 (S2415).

After the processing in S2415 is finished, the text-data anonymizing apparatus 104 starts processing in S2416 described later. Timing for starting the processing in S2416 and subsequent steps may be arbitrary timing after S2416 described above. For example, the processing is started when the administrator makes an instruction for execution using the input device 203 of the text-data anonymizing apparatus 104, when the analysis result table 1921 of the text-data anonymizing apparatus 104 is updated, at every predetermined time, and the like.

The anonymizing section 1931 of the text-data anonymizing apparatus 104 acquires the analysis result table 1921 from the analyzing apparatus 1901 (S2416). The anonymizing section 1931 converts an anonym word included in the analysis result table 1921 into a real name word (S2417). For that purpose, first, the anonymizing section 1931 selects one of the fields 2202 of the records in the analysis result table 1921 and judges whether a word matching a value of the selected field 2202 is included in the field 2102 of each of the records in the anonym association table 1942. As a result of this judgment, when a matching word is included, the anonymizing section 1931 judges that the value of the selected field 2202 is an anonym word and extracts a value of the field 2101 of a record including the matching word in the field 2102 of the anonym association table 1942. As a result of this judgment, when a matching word is not included, the anonymizing section 1931 judges that the value of the selected field 2202 is an anonym word. The anonymizing section 1931 adds a new record in the real name analysis result table 1943 in the memory 203 and stores, as a value of the field 2211 of this record, the field 2201 of the record including the field 2202 selected by the processing. When it is judged that the value of the field 2202 selected by the processing is an anonym word, the anonymizing section 1931 stores the extracted value of the field 2101 as a value of the field 2212 of the record added anew. When it is judged that the value of the field 2202 selected by the processing is not an anonym word, the anonymizing section 1931 stores the value of the selected field 2202. The anonymizing section 1931 applies this processing to all the records in the analysis result table 1921.

The anonymizing section 1931 outputs the real name analysis result table 1943 in the memory 203 to the storage 202 (S2418).

The system according to the second embodiment is characterized in that a method of converting an anonym word can be designated by using the anonymization condition information 1941. Since the system according to the second embodiment has the identifiability evaluating apparatus 103, it is possible to surely anonymize a set of words having high identifiability by the same processing as that in the system according to the first embodiment. However, in the system according to the second embodiment, the text-data anonymizing apparatus 104 can adjust identifiability of text data given by an anonym word by anonymizing the text data in accordance with conditions set by using the anonymization condition information 1941. Specifically, for example, when the option "common in all texts" is given, identifiability of text data of a converted anonym word is the same as that before anonymization. In the system according to the second embodiment, when a system user does not desire such conversion, it is possible to reduce identifiability to be smaller than that before anonymization by selecting the option "common in each text".

Moreover, in the system according to the second embodiment, while disclosing only anonymized text data to an analyzing system and entrusting the analyzing system with analysis, it is easy to convert an anonym word included in a result of the analysis into a real name word using the anonym association table 1942. As an application of this system, for example, analysis of text data is entrusted to a corporation. An entrusting corporation can anonymize text data and pass the text data to a corporation entrusted with analysis. The entrusting corporation can return an analysis result obtained after that to text data with a real name. In particular, when the option "common in all texts" is selected in the anonymization condition information 1941, in analysis performed by using a part of speech of a word, an appearance frequency of the word, a co-occurrence frequency of a plurality of words, and the like, it is possible to obtain a result completely the same as an analysis result concerning text data before anonymization.

As described above, the analysis processing by the analyzing section 1911 may be arbitrary. As the analysis processing by the analyzing section 1911, for example, it is possible to perform similar text data classification considering that the anonymized text data table 142 is usual text data. Such a technique of similar text data classification is a conventional technique. For example, it is advisable to use a technique disclosed in "Akihiko Takano, et al.: Development of a Generic Engine for Transposable Association and Application to Analysis of Large Corpora, Information-Technology Promotion Agency, Creative Information Technology Promotion Project, 2001 Project Report".

The embodiments of the present invention have been described in detail with reference to the drawings. However, a specific configuration of the present invention is not limited to the embodiments. Design change and the like can be made without departing from the spirit of the present invention.

For example, text data for acquiring an identification probability may be different from anonymization object text data. Specifically, for example, it is conceivable that the text data table 111 including text data acquired in the past one month and text data for a long period of time in the past (hereinafter, referred to as long period text data) different from the text data table 111 are stored in the storage 202 of the contact-center-data managing apparatus 101. In this case, the contact-center-data managing apparatus 101 transmits the long period text data to the text-data analyzing apparatus 102 in the processing in S1102. The text-data analyzing apparatus 102 applies the processing in S1103 to the long period text data to create the index information table 126. In the processing in S1105, the identifiability evaluating apparatus 103 performs evaluation of identifiability with reference to the index information table 126 created on the basis of the long period text data. The identifiability evaluation result information 133 created by this processing has an anonymization unnecessary word set based on the long period text data. In the text anonymization processing in S1109, the anonymizing section 141 of the text-data anonymizing apparatus 104 acquires the identifiability evaluation result information 133 based on the long period text data from the identifiability evaluating apparatus 103. The anonymizing section 141 applies, with reference to the identifiability evaluation result information 133, anonymization processing to the text data acquired from the text data table 111 of the contact-center-data managing apparatus 101. Consequently, an appearing word set frequently appearing in the long period text data is disclosed and an appearing word set not appearing frequently is converted into an anonym word.

As the storage in the memory 203 of the index information table 126' and the processing applied to the index information table 126' in S1105, it is possible to use an arbitrary index processing method. For example, a technique disclosed in "Akihiko Takano, et al.: Development of a Generic Engine for Transposable Association and Application to Analysis of Large Corpora, Information-Technology Promotion Agency, Creative Information Technology Promotion Project, 2001 Project Report" may be used.

In S1610, the identifiability evaluating section 131 of the identifiability evaluating apparatus 103 outputs an anonymization unnecessary word set to the anonymization unnecessary word table 134 prepared in the memory 203 and stores the anonymization unnecessary word table 134 in the storage 202 last. However, the present invention is not limited to this. For example, it is also possible that the anonymization unnecessary word table 134 is prepared in the storage 202 from the beginning and the anonymization unnecessary word set is directly outputted to the anonymization unnecessary word table 134. In this case, S1311 for collectively outputting the anonymization unnecessary word table 134 in the memory 203 to the storage 202 is omitted.

In the embodiments, in order to create an anonym word, a serial number or the like is combined with information for each piece of text data and linked data. However, a technique for creating an anonym word is not limited to this. The information for each piece of text data and linked data is not always necessary and does not have to be a serial number. For example, a random number or the like may be generated to create an anonym word without depending on text data, linked data, and the like.

The specification and drawings are, accordingly, to be regarded in an illustrative rather than a restrictive sense. It will, however, be evident that various modifications and changes may be made thereto without departing from the spirit and scope of the invention as set forth in the claims.

What is claimed is:

1. A text anonymizing apparatus, comprising:
   a storage device which stores a plurality of pieces of text data, each including a character string;
   a data linking unit which classifies each of the plurality of pieces of text data into one of a plurality of kinds of linked data, in accordance with a classification condition, to classify a subset of the plurality of pieces of text data having a same classification condition together as pieces of linked data;
   a morpheme analysis unit which extracts a plurality of words included in the pieces of linked data classified by the data linking unit;
   an evaluating unit which extracts, among combinations of words including at least one of the extracted words, a combination of words in which the number of occurrences of the combination of words occurring within the pieces of linked data, is equal to or greater than a threshold;
   an anonymizing unit which anonymizes, among words included in a character string included in the pieces of linked data, original words matching at least some of the extracted words and not matching words forming the extracted combination of words, as anonymized words; and
   an output processing unit which outputs text data including the anonymized words substituted for the original words, to an output device.

2. A text anonymizing apparatus according to claim 1, wherein:
   the evaluating unit selects a set of different words while adding one word at a time among the extracted words, as a selected combination of words, then counts, every time selection is performed, the number of occurrences of the selected combination of words occurring within the pieces of linked data including all words forming the selected combination of words, and, when it is judged that the number is less than the threshold, stops the selection of a word and the counting of the number of the pieces of linked data; and
   the anonymizing unit anonymizes, among the words included in each of the plurality of pieces of text data, a word matching at least some of the extracted words and not matching words forming each of all combinations of words selected before the stopping, as the extracted combination of words.

3. A text anonymizing apparatus according to claim 2, wherein the evaluating unit causes the storage device to store each of all the combinations of words selected before the stopping as the extracted combination of words, and selects, when a combination of words matching the selected combination of words is already included in the extracted combination of words, another combination of words.

4. A text anonymizing apparatus according to claim 1, further comprising a classification-condition receiving unit which receives classification condition information that is inputted from an input device, and that is at least one of: at least one word included in a character string of the plurality of pieces of text data, and attribute information further included in each of the plurality of pieces of text data,
   wherein the data linking unit classifies each of the plurality of pieces of text data in accordance with the received classification condition information.

5. A text anonymizing apparatus according to claim 1, further comprising:
   an analyzing unit which analyses text data including the anonymized word and acquires analysis result information; and
   an analysis-result-output processing unit which outputs the acquired analysis result information to the output device.

6. A text anonymizing apparatus according to claim 5, wherein:
   the anonymizing unit further causes the storage device to store anonym correspondence information associating, among the words included in the character string included in each of the plurality of pieces of text data, a word matching at least some of the extracted words and not matching words forming the extracted combination of words, and an anonym word created by anonymizing the word, and further acquires, when a word matching the anonym word included in the anonym correspondence information is included in the analysis result information analyzed by the analyzing unit, real name analysis result information obtained by replacing the word with a word associated with the matching anonym word from the anonym correspondence information; and
   the text anonymizing apparatus further comprises a real-name-analysis-result-output processing unit which outputs the real name analysis result information to the output device.

7. A text anonymizing apparatus according to claim 1, wherein the data linking unit classifies each of the plurality of pieces of text data including personal information of a plurality of individuals, in accordance with a classification condition for classifying the plurality of pieces of text data by kind that includes personal information of a particular individual.

8. A processor-implemented text anonymizing method which anonymizes text data including a character string, using a text anonymizing apparatus, and a storage device which stores a plurality of pieces of text data each including a character string, the text anonymizing method comprising:
- storing the plurality of pieces of text data, each including a character string;
- classifying each of the plurality of pieces of text data into one of a plurality of kinds of linked data, in accordance with a classification condition, to classify a subset of the plurality of pieces of text data having a same classification condition together as pieces of linked data;
- extracting, via morpheme analysis, a plurality of words included in the pieces of linked data classified by the classifying operation;
- extracting, among combinations of words including at least one of the extracted words, a combination of words in which the number of occurrences of the combination of words occurring within the pieces of linked data, is equal to or greater than a threshold;
- anonymizing, among words included in a character string included in the pieces of linked data, original words matching at least some of the extracted words and not matching words forming the extracted combination of words, as anonymized words; and
- outputting text data including the anonymized words substituted for the original words, to an output device.

9. A non-transitory computer-readable medium embodying a text anonymizing program which anonymizes text data including a character string, using a text anonymizing and a storage device which stores a plurality of pieces of text data each including a character string, the program upon execution by a processor effecting operations comprising:
- storing the plurality of pieces of text data, each including a character string;
- classifying each of the plurality of pieces of text data into one of a plurality of kinds of linked data, in accordance with a classification condition, to classify a subset of the plurality of pieces of text data having a same classification condition together as pieces of linked data;
- extracting, via morpheme analysis, a plurality of words included in the pieces of linked data classified by the classifying operation;
- extracting, among combinations of words including at least one of the extracted words, a combination of words in which the number of occurrences of the combination of words occurring within the pieces of linked data, is equal to or greater than a threshold;
- anonymizing, among words included in a character string included in the pieces of linked data, original words matching at least some of the extracted words and not matching words forming the extracted combination of words, as anonymized words; and
- outputting text data including the anonymized words substituted for the original words, to an output device.

* * * * *